US007054647B2

(12) United States Patent
Inaba et al.

(10) Patent No.: US 7,054,647 B2
(45) Date of Patent: May 30, 2006

(54) POSITION INFORMATION SYSTEM AND DISPATCH SUPPORTING SYSTEM

(75) Inventors: Minoru Inaba, Kyoto (JP); Kosuke Nakanishi, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 102 days.

(21) Appl. No.: 10/381,348

(22) PCT Filed: Sep. 26, 2001

(86) PCT No.: PCT/JP01/08404

§ 371 (c)(1),
(2), (4) Date: Sep. 29, 2003

(87) PCT Pub. No.: WO02/27589

PCT Pub. Date: Apr. 4, 2002

(65) Prior Publication Data

US 2004/0054647 A1 Mar. 18, 2004

(30) Foreign Application Priority Data

Sep. 27, 2000 (JP) ............................. 2000-293743
Dec. 27, 2000 (JP) ............................. 2000-399008

(51) Int. Cl.
*H04Q 7/20* (2006.01)
(52) U.S. Cl. .................................. 455/456.1; 455/457
(58) Field of Classification Search ................ 455/457, 455/456.1
See application file for complete search history.

(56) References Cited

FOREIGN PATENT DOCUMENTS

| CN | 1158037 | 8/1997 |
|---|---|---|
| CN | 1237858 | 12/1999 |
| CN | 1240940 | 1/2000 |
| JP | 8-310757 | 11/1996 |
| JP | 9-98097 | 4/1997 |
| JP | 9-297796 | 11/1997 |
| JP | 2000-148863 | 5/2000 |

OTHER PUBLICATIONS

Jiro Yoshino, "Grasping position information of Employees by PHS to Reduce Moving Time for Visiting for Repairing Equipment" (Tokyo Zerox Co., Ltd.), Nekkei Communications Sep. 7, 1998, pp. 204-208.
"Mobile GIS', making use of position information for business", Mobile Media Magazine, Sep. 1999, vol. 51, pp. 11-15.

*Primary Examiner*—William D. Cumming
(74) *Attorney, Agent, or Firm*—Hamre, Schumann, Mueller & Larson, P.C.

(57) ABSTRACT

A position information system (101) obtains position information (latitude and longitude) of a dispatch location from a telephone number/address DB (113) or an address/position information DB (114) based on the sender telephone number of a telephone (103) of a customer or the like requesting the dispatch. A display control portion (132) obtains map images of the vicinity of the dispatch location from a map DB (138) based on the position information, and displays these on a display (136) with the display location in the center. Also, position information and the current status of each dispatch staff member is obtained at any time from portable terminals (104) of the dispatch staff members, and based on this information, markings representing the dispatch staff members in the vicinity of the dispatch location are displayed on the map, allowing a staff member to be dispatched to be quickly and appropriately selected.

7 Claims, 16 Drawing Sheets

| Name | Customer Code | Address | Position Information | Telephone Number | Measuring Device Model | Device ID Number |
|---|---|---|---|---|---|---|
| Company A | 2600141 | Kyoto Prefecture, Kyoto, Minami Ward··· | xxx , yyy | xxx-xxx-xxxx-xxxx | HA-8131 | HA8131110041 |
| Hospital B | 2600287 | Kyoto Prefecture, Kyoto, Sakyo Ward··· | xxx , yyy | xxx-xxx-xxxx-xxxx | SP-4420 | SP4420092511 |
| Company C | 2600153 | Kyoto Prefecture, Nagaokakyo··· | xxx , yyy | xxx-xxx-xxxx-xxxx | HA-8131 | HA8131052372 |
| Company D | 2601192 | Kyoto Prefecture, Kyoto, Minami Ward··· | xxx , yyy | xxx-xxx-xxxx-xxxx | HA-8130 | HA8130155468 |
| Clinic E | 2600081 | Kyoto Prefecture, Nagaokakyo··· | xxx , yyy | xxx-xxx-xxxx-xxxx | SP-4420 | SP4420100317 |

FIG. 2

| Name | Customer Service Member Code | Telephone Number | Electronic Mail Address | Position Information | Event Information |
|---|---|---|---|---|---|
| xxxx | xxxxxx | xxx-xxxxx-xxxxx | xxx@xxx.xxx | xxx , yyy | Working |
| xxxx | xxxxxx | xxx-xxxxx-xxxxx | xxx@xxx.xxx | xxx , yyy | Moving |
| xxxx | xxxxxx | xxx-xxxxx-xxxxx | xxx@xxx.xxx | xxx , yyy | on Break |
| xxxx | xxxxxx | xxx-xxxxx-xxxxx | xxx@xxx.xxx | xxx , yyy | Standby |

FIG. 3

| Representative | Reception Number | Customer Code | Measuring Device Model | Device ID Number | Claim Designation | Claim Content | Cause | Response |
|---|---|---|---|---|---|---|---|---|
| xxxxx | 370000631 | 2600141 | HA-8131 | HA8131110041 | Mechanical Claim | Mechanical Failure | Deteriorated Filter | Change Filter, Change O-ring |
| xxxxx | 370000627 | 2600081 | SP-4420 | SP4420093158 | Mechanical Claim | Mechanical Maintenance | | |

FIG. 6

Customer Claim Reception

Reception Date/Time: 2000/8/28 16:05 — 51
Reception Number: 370000631 — 52

- ● Mechanical Claim
- ○ Business-Related Call
- ○ Technical Inquiry

53

54 54a

Model: HA-8131 ▽  Device ID: 3350405012 — 55
State: ▽  Customer Code:
Customer Name:  TEL:
Address:  Technician in Charge:  Extension:
Department Name:

56

Claim Content
- ● Mechanical Claim
  - Error:  Check:  Trouble:
  - Message:  Other:
- ○ Data Abnormality
  - High:  Low:  Varied:  Other:

57

Response ● Immediate ○ Designate:  ○ Visit at a Later Date:

| Reception Date/Time | Reception Number | Customer Code | Measuring Device Model | Device ID Number | Claim Designation | Claim Content | Response Speed |
|---|---|---|---|---|---|---|---|
| 2000/8/28 16:05 | 370000631 | 2600141 | HA-8131 | HA8131110041 | Mechanical Claim | Mechanical Failure | Immediate |
| 2000/8/28 15:20 | 370000630 | 2600081 | SP-4420 | SP4420100317 | Business-Related Call | | Visit at Later Date |
| 2000/8/28 15:10 | 370000629 | 2600287 | SP-4420 | SP4420092511 | Technical Inquiry | | Immediate |

FIG. 9

POSITION INFORMATION SYSTEM AND DISPATCH SUPPORTING SYSTEM

TECHNICAL FIELD

The present invention relates to dispatch support systems that employ positioning systems such as GPS (global positioning system) or PHS (personal handyphone system) so as to quickly dispatch a dispatch staff member to customer facilities or the like, and more particularly relates to dispatch support systems that employ (1) position information systems that specify and output position information on the location of a telephone based on the transmission number of the telephone when a call is received, and (2) position display systems that display a map on a display based on the position information that is obtained.

BACKGROUND ART

Conventionally, systems for improving customer service by employing a customer support center or the like as a reception desk to field telephone calls from customers and contact a "customer relations coordinator" (dispatch staff member) and direct him toward the customer, when there is a telephone call from a customer, have been adopted widely in a variety of different fields.

Conventionally, one common method (first method) for selecting the dispatch staff member and performing the dispatch command was for each dispatch staff member to carry a pager, a wireless device, or a portable telephone, for example, and when a customer contacts the customer support center by telephone, the operator of the customer support center selects a suitable dispatch staff member to handle this request and sends a command to the pager or the like of that dispatch staff member, instructing him to proceed to the customer.

Alternatively, another method (second method) that is widely used is for the customer support center to send the same message to the pagers or the like of all dispatch staff members at once, and dispatch staff members that are capable of handling that customer request then notify the customer support center that they will proceed to that customer.

However, with the first conventional method mentioned above, the customer support center has no way to determine in real-time the current status of each dispatch staff member (whether he is working, on break, or traveling, for example) and the distance from the current location of the dispatch staff member to the customer to which he is to be dispatched, for example, and thus there was the problem that it was not always possible to select the most appropriate dispatch staff member to send to the customer.

Also, with the second method, there was no way for each dispatch staff member to know the current status of the other dispatch staff members, so that the dispatch staff member that contacts the customer support center is not necessarily the one that can reach the client in the shortest amount of time. Also, if a plurality of dispatch staff members contact the customer support center at the same time, then, when selecting one of the plurality of dispatch staff members, there was the same problem as with the first method.

Furthermore, when a dispatch request is made from a customer to the customer support center, it is first necessary to specify the address of that customer to which a dispatch staff member is to be dispatched when selecting the dispatch staff member to dispatch to that customer. In this case, if the address, for example, of the customer has been registered previously in a database, then the address can be specified quickly. However, if the address is not registered, such as in the case of a new customer, it is first necessary to ask the customer his address, and this was a problem because it precluded a fast response.

In order to solve these problems, it is an object of the present invention to provide a position information system with which, when a customer or the like makes a telephone call, the position of the customer or the like can be determined quickly based on the sender telephone number, and also to provide a dispatch support system with which a quick and reliable response is possible by determining the location and the current status of each dispatch staff member and appropriately selecting the staff member to be dispatched from the customer support center.

DISCLOSURE OF THE INVENTION

To achieve the above objects, a position information system of the invention includes a telephone number obtaining portion for obtaining a sender telephone number when a telephone call is received, and a position information obtaining portion for obtaining position information on the sender telephone using a database with which the location where that telephone is installed can be specified from the telephone number. It should be noted that it is only necessary that the database allow the position information obtaining portion of the present position information system to use data stored therein directly or indirectly, and the database is not an essential component of the present position information system.

With the above configuration, it is possible to provide a position information system with which position information on the source of the transmission can be obtained from the number of the sender telephone, so that even if a telephone call is received from an unknown party, the location of the other party on the line can be determined quickly.

In the above position information system, it is preferable that the position information is an address of the location where that sender telephone is installed.

In the above position information system, it is preferable that the position information is the latitude and the longitude of the location where that sender telephone is installed.

To solve the foregoing problems, a position display system of the present invention uses any one of the foregoing position information systems, and includes a display, a map database storing map image data, and a display control portion that, when a telephone call is received, obtains map image data on a region corresponding to position information from the map database and displays these on the display based on the position information of the sender telephone that is obtained by the position information system.

Thus, it is possible to provide a position display system that can obtain position information on the transmission source from the sender telephone number, and based on this position information, can display a map of the transmission source on the display. Consequently, even if a telephone call is received from an unknown party, the location of the other party on the line can be quickly determined with the map on the display.

In the above position display system, it is preferable that the map image data that are obtained from the map database are map image data in which the sender telephone is located in the center. Thus, the location of the other party on the line can be displayed on the map in such a manner that it is in the center of the display, and thus the appearance of the area around the other party can be ascertained without scrolling the screen.

Also, in the above position display system, it is preferable that the position display system further includes a mobile information storage portion for storing mobile information that is transmitted from mobile terminals and that includes position information on the mobile terminals, and that the display control portion displays markings representing the mobile terminals on the map of the display based on the mobile information obtained from the mobile information storage portion.

Thus, for example, by having the dispatch staff members carry mobile terminals, the distribution, for example, of the dispatch staff members in the vicinity of the other party on the line can be confirmed on the display. Consequently, staff members can be dispatched quickly, for example, to the location of the other party on the line.

Furthermore, in this case, it is preferable that the mobile information further includes information representing a current status of the staff member carrying that mobile terminal. Thus, it is possible to ascertain not only the location of the staff members carrying the mobile terminals but also the status of that member (for example, whether he is at work, traveling, or on break), and this allows a dispatch staff member to be selected quickly and appropriately.

Also, a first storage medium according to the present invention is a computer-readable storage medium that stores a program executing a process for obtaining a sender telephone number when a telephone call is received and for obtaining position information on the sender telephone using a database with which the location where that telephone is installed can be specified from the telephone number. The position information system of the invention can be achieved by reading the program stored on this storage medium to a computer and executing it.

A second storage medium according to the present invention is a computer-readable storage medium that stores a program executing a process for obtaining a sender telephone number when a telephone call is received, obtaining position information on the sender telephone using a database with which a location where that telephone is installed can be specified from the telephone number, obtaining map image data on a region corresponding to the position information using a map database storing map image data, and displaying obtained map image data on a display. The position display system of the invention can be achieved by reading the program stored on this storage medium to a computer and executing it.

To achieve the above objects, a dispatch support system of the present invention is a dispatch support system that includes terminal devices carried by dispatch staff members and a management device for supporting dispatch of the dispatch staff members, wherein the terminal devices include a position information obtaining portion for obtaining information on its location from a positioning system, an input portion for the dispatch staff members to input status data expressing their status, and a communications portion for transmitting position information obtained by the position information obtaining portion and status data input through the input portion, to the management device, and wherein the management device includes a communications portion that communicates with the terminal devices, a dispatch staff member information storage portion storing dispatch staff member information on each dispatch staff member, including position information and status data received from the terminal devices, and a support processing portion that, when there is a request for dispatch, performs a process for supporting selection of a staff member to dispatch to a dispatch location based on dispatch location information including position information on the dispatch location and dispatch staff member information on the dispatch staff members that is obtained from the dispatch staff member information storage portion.

According to the above configuration, status data representing the status of the dispatch staff members and position information are transmitted to the management device from the terminal devices carried by the dispatch staff members. Thus, it is possible to provide a dispatch support system that can support the selection of an appropriate dispatch staff member, when there is a dispatch request, based on the location and the status of each dispatch staff member. It should be noted that the process for supporting dispatch staff member selection that is performed by the support processing portion is not limited to a process for specifying a single dispatch staff member to be selected as the staff member to be dispatched, and for example may be a process for easing the selection of dispatch staff members, such as a process for displaying information that serves as a selection criterion and a process for narrowing down the number of candidates.

In the above dispatch support system, it is preferable that the management device further includes a telephone number obtaining portion for obtaining the sender telephone number when a telephone call is received, and a position information obtaining portion for obtaining position information on the sender telephone using a database with which the telephone number and a location where that telephone is installed can be specified, and that the support processing portion uses position information obtained by the position information obtaining portion as position information on the dispatch location.

With this configuration, the location where a telephone is installed is specified from the telephone number of an incoming call and is used as position information on the dispatch location, and thus it is not necessary for the customer or the like requesting a dispatch to say his address, for example. Thus, a dispatch support system that allows a faster response can be provided.

In the above dispatch support system, it is preferable that the support processing portion in the management device includes a display and a display control portion, and that the display control portion, when there is a dispatch request, displays a map of the area surrounding the dispatch location on a display in such a manner that the dispatch location is located in a screen center portion based on the position information of that dispatch location, and also displays markings representing dispatch staff members in the area surrounding the dispatch location at the locations of the dispatch staff members in the map that is displayed on the display, based on the position information of the dispatch staff members included in the dispatch staff member information.

With the above configuration, the locations of dispatch staff members in the area are displayed on the map of the area surrounding the dispatch location on the display of the management device, and thus it is possible to determine the distance between the dispatch location and each dispatch staff member. Moreover, the map is displayed such that the dispatch location is located in the center of the screen, and thus with one glance it is possible to grasp the positional relationship between the dispatch location and each dispatch staff member without having to scroll the screen, for example. Consequently, it becomes easy to select staff members for dispatch.

In the above dispatch support system, it is preferable that the display control portion sets the markings representing the dispatch staff members in the area surrounding the dispatch location to a display condition corresponding to the status of the dispatch staff members based on status data of the dispatch staff members, which are included in the dispatch staff member information.

With the above configuration, the status of each dispatch staff member can be confirmed on the display of the management device. Thus, it becomes even easier to select a staff member to dispatch. It should be noted that the appearance of the markings representing the dispatch staff members that display the status of the display status members can not only be different in shape, design, or color to correspond to the status of the dispatch staff members, but also may include the addition of symbols or written information expressing the status of the dispatch staff members to the markings.

In the above dispatch support system, it is preferable that the support processing portion in the management device further includes a selection portion for selecting an appropriate staff member to be dispatched to the dispatch location from the dispatch staff members in the area surrounding the dispatch location based on the dispatch staff member information on each dispatch staff member, which is obtained from the dispatch staff member information storage portion.

With the above configuration, an appropriate dispatch staff member is selected by the selection portion of the management device, and as long as this selection can narrow down the candidates, is not limited to specifying one dispatch staff member.

In the above dispatch support system, it is preferable that the management device further includes an information provision portion for transmitting dispatch staff member support information to the terminal devices of dispatch staff members via the communications portion.

With the above configuration, it is possible to transmit dispatch staff member support information, which is helpful for work at the dispatch location, to the terminal device of the dispatch staff member, so that the work efficiency of the dispatch staff member at the dispatch location can be improved.

In the above dispatch support system, it is preferable that the dispatch staff member support information includes information relating to service cases at that dispatch location.

With the above configuration, records of services performed in the past at that dispatch location are transmitted to the terminal device of the dispatch staff member as dispatch staff member support information. Thus, the dispatch staff member can perform his task, for example, at the dispatch location while referencing past cases, and thus not only is the work efficiency of the dispatch staff member improved, but it is also possible to provide service of the same quality at the dispatch location even if the dispatch staff member is different.

In the above dispatch support system, it is preferable that the dispatch staff member support information includes information relating to identical cases.

With the above configuration, information related to identical cases is transmitted to the terminal device of the dispatch staff member as dispatch staff member support information, so that there is the benefit that by the dispatch staff members using this information when handling a case in which they have no experience, for example, their work efficiency is improved and the quality of service provided at the dispatch location is improved.

Also, to achieve the foregoing objects, a management device of the present invention is a management device for communicating with terminal devices carried by dispatch staff members in a dispatch support system so as to support the dispatch of the dispatch staff members, wherein the terminal devices transmit to the management device position information on their location obtained from a positioning system and status data that express a status of the dispatch staff member and that are input by that dispatch staff member. The management device includes a communications portion for communicating with the terminal devices, a dispatch staff member information storage portion for storing dispatch staff member information on each dispatch staff member, including position information and status data received from the terminal devices, and a support processing portion that carries out a process for supporting selection of staff members to dispatch to the dispatch location, when there is a dispatch request, based on the dispatch location information including position information on the dispatch location, and dispatch staff member information on the dispatch staff members, which is obtained from the dispatch staff member information storage portion.

According to the above configuration, the management device receives status data representing the status of the dispatch staff members and position information from the terminal devices carried by the dispatch staff members. Thus, it is possible to provide a management device that can support the selection of an appropriate dispatch staff member based on the location and the status of each dispatch staff member when there is a dispatch request. It should be noted that the process for supporting dispatch staff member selection that is performed by the support processing portion is not limited to a process for specifying a single dispatch staff member to be selected as the staff member to be dispatched, and for example may be a process for easing the selection of dispatch staff members, such as a process for displaying information that serves as a selection criterion and a process for narrowing down the number of candidates.

In the above management device, it is preferable that the support processing portion includes a display and a display control portion, and that the display control portion, when there is a dispatch request, displays a map of the area surrounding the dispatch location, based on the position information of the display location, on the display in such a manner that the dispatch location is located in a screen center portion, and displays markings that represent dispatch staff members in the area surrounding the dispatch location at the locations of the dispatch members in the map that is displayed on the display, based on the position information of the dispatch staff members included in the dispatch staff member information.

With the above configuration, a map of the area surrounding the dispatch location is displayed on the display, and the location of dispatch staff members in the area are displayed on the map of the area surrounding the dispatch location on the display of the management device, and thus it is possible to determine the distance between the dispatch location and each dispatch staff member. Moreover, the map is displayed such that the dispatch location is located in the center of the screen, and thus with one glance it is possible to grasp the positional relationship between the dispatch location and each dispatch staff member without having to scroll the screen, for example. Consequently, it becomes easy to select staff members for dispatch.

In the above management device, it is preferable that the display control portion sets the markings that represent the dispatch staff members in the area surrounding the dispatch location to a display status that corresponds to the status of the dispatch staff members based on the status data of the dispatch staff members included in the dispatch staff member information.

With the above configuration, the status of each dispatch staff member can be confirmed on the display of the management device. Thus, it becomes even easier to select a staff member to dispatch. It should be noted that the appearance of the markings representing the dispatch staff members that are set to a display condition that corresponds to the status of the display status members can not only be different in shape, design, or color to correspond to the status of the dispatch staff members, but may also include the addition of symbols or written information expressing the status of the dispatch staff members to the markings.

In the above management device, it is preferable that the support processing portion further includes a selection portion for selecting an appropriate staff member as the dispatch staff member from the dispatch staff members in the area surrounding the dispatch location based on the dispatch staff member information, which is obtained from the dispatch staff member information storage portion.

With the above configuration, an appropriate dispatch staff member is selected by the selection portion of the management device, and as long as this selection can narrow down the candidates, is not limited to specifying one dispatch staff member.

The above management device preferably further includes an information provision portion for transmitting dispatch staff member support information to the terminal devices of the dispatch staff members via the communications portion.

With the above configuration, it is possible to transmit dispatch staff member support information that is helpful for the task at the dispatch location to the terminal device of the dispatch staff member, so that the work efficiency of the dispatch staff member at the dispatch location can be improved.

In the above management device, it is preferable that the dispatch staff member support information includes information relating to service cases at that dispatch location.

With the above configuration, records of services performed in the past at that dispatch location are transmitted to the terminal device of the dispatch staff member as dispatch staff member support information. Thus, the dispatch staff member can perform his task, for example, at the dispatch location while referencing past cases, and thus not only is the work efficiency of the dispatch staff member improved, but it is also possible to provide service of the same quality at the dispatch location even if the dispatch staff member is different.

In the above management device, it is preferable that the dispatch staff member support information includes information relating to identical cases.

With the above configuration, information related to identical cases is transmitted to the terminal device of the dispatch staff member as dispatch staff member support information, so that there is the benefit that by the dispatch staff members using this information when handling a case in which they have no experience, for example, their work efficiency is improved and the quality of service provided at the dispatch location is also increased.

To achieve the foregoing objects, a terminal device of the present invention is a terminal device carried by each dispatch staff member in a dispatch support system that includes a management device for supporting dispatch of the dispatch staff members, wherein the management device includes a communications portion for communicating with the terminal device and a dispatch staff member information storage portion storing dispatch staff member information that includes position information and status data received from the terminal device of each dispatch staff member, and when there is a dispatch request, the management device performs a process for supporting selection of a dispatch staff member to dispatch to a dispatch location based on dispatch location information including position information on the dispatch location and dispatch staff member information on the dispatch staff members, which is obtained from the dispatch staff member information storage portion, and wherein the terminal device includes a position information obtaining portion for obtaining position information of the terminal device from a positioning system, an input portion with which the dispatch staff members input status data expressing their status, and a communications portion for transmitting position information obtained by the position information obtaining portion and status data input through the input portion to the management portion.

With the above configuration, status data representing the status of each dispatch staff member and position information are transmitted from the terminal device carried by each dispatch staff member. Thus, it is possible to support the selection of an appropriate staff member to dispatch to the dispatch location when there is a dispatch request based on the location and the status of each dispatch staff member.

In the above terminal device, it is preferable that dispatch staff member support information is transmitted from the management device to the terminal device of the dispatch staff members, and that the terminal device further includes a display and receives the dispatch staff member support information through the communications portion and displays the dispatch staff member support information on the display.

With the above configuration, the dispatch staff members can view, on the display of their terminal device, dispatch staff member support information that is useful for the task at the dispatch location, and thus the work efficiency of the dispatch staff members at dispatch locations is increased.

In the above terminal device, it is preferable that the dispatch staff member support information includes information relating to service cases at that dispatch location.

With the above configuration, records of services performed in the past at that dispatch location can be viewed by the dispatch staff members. Thus, the dispatch staff member can perform his task, for example, at the dispatch location while referencing past cases, and thus not only is the work efficiency of the dispatch staff member improved, but it is also possible to provide service of the same quality at the dispatch location even if the dispatch staff member is different.

In the above terminal device, it is preferable that the dispatch staff member support information includes information relating to identical cases.

With the above configuration, information related to identical cases can be viewed by the dispatch staff members on the display, so that there is the benefit that by the dispatch staff members using this information when handling a case in which they have no experience, for example, their work efficiency is improved and the quality of service provided at the dispatch location is improved.

BRIEF DESCRIPTION OF DRAWINGS

FIG. 2 is a diagram that schematically shows an example of customer information stored in a customer information database provided in a claim processing system of the dispatch support system.

FIG. 3 is a diagram that schematically shows an example of customer service member information stored in a customer service member information database provided in a claim processing system.

FIG. 6 is a diagram that schematically shows an example of task report data stored in a task report database provided in the claim processing system.

FIG. 8 is a diagram showing an example of the customer claim reception screen that is displayed on the display of the claim reception computer.

FIG. 9 is a diagram that schematically shows an example of claim data stored in a claim database provided in the claim processing system.

BEST MODE FOR CARRYING OUT THE INVENTION

First Embodiment

Hereinafter, an embodiment of the present invention is described with reference to the drawings.

The dispatch support system of the present embodiment is a customer service support system that is run by the manufacturer of measuring devices so as to provide after-service to users (customers) of the measuring devices, and in this system, calls (hereinafter, referred to as "claims") such as questions or problems regarding the operation, for example, of the measuring device are received from customers, and if necessary, an appropriate customer service member (dispatch staff member) is dispatched to that customer.

Figure 1:
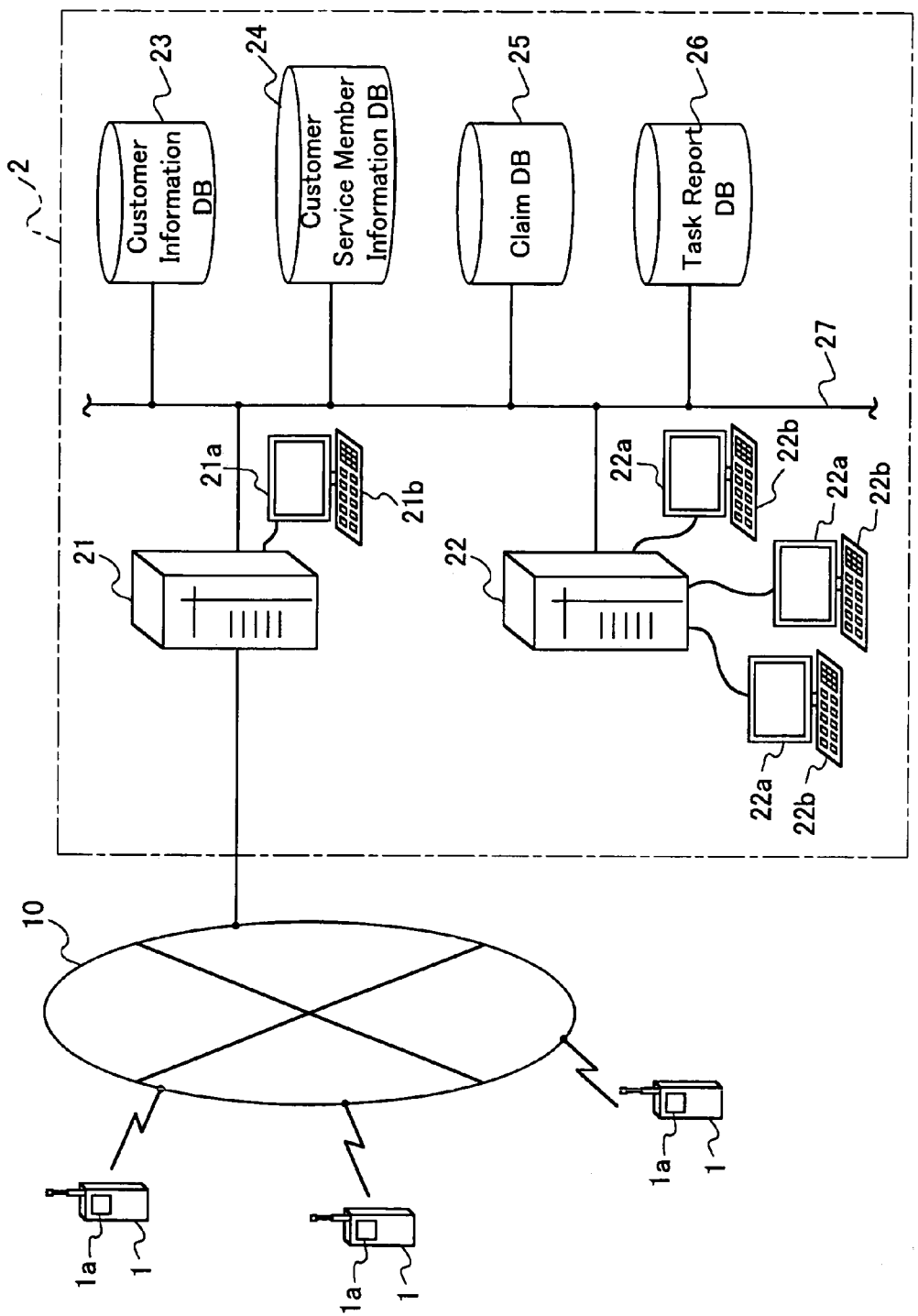
FIG. 1 is a block diagram showing the configuration of the dispatch support system of a first embodiment of the invention.

FIG. 1 is a block diagram showing the configuration of the customer service support system of the present embodiment. As shown in FIG. 1, this customer service support system includes terminal devices 1 carried by each customer service member and a claim processing system (management device) 2 set up in the customer support center of the manufacturer of the measuring device.

The terminal devices 1 have an electronic mail function in addition to a portable telephone function, and through this electronic mail function can communicate with a dispatch order computer 21 of the claim processing system 2 via a wide-area communications network 10. It should be noted that the wide-area communications network 10 includes a mobile communications network and enables communication between the claim processing system 2 serving as a fixed station and the terminal devices 1 serving as mobile stations.

Also, the terminal devices 1 are internally provided with a GPS (global positioning system) receiver (described later) that receives position information from a GPS, and the position information on the customer service member carrying the terminal device 1 is sent to the claim processing system 2 through electronic mail.

Moreover, the terminal devices 1 have a function for notifying the claim processing system 2 of event information representing the current status of the customer service members. Each customer service member is required to input event information to his terminal device 1 when he starts a particular event, such as when he starts working at the customer location, when he takes a break, or when he starts traveling, for example. The event information that is input is sent to the claim processing system 2 through the electronic mail function of the terminal devices 1.

As described above, by each customer service member sending position information obtained from a GPS and the event information, which he has input, to the claim processing system 2 from his terminal device 1, the claim processing system 2 is able to determine the position and the current status of each customer service member.

Here, the overall configuration of the claim processing system 2 is described.

As shown in FIG. 1, the claim processing system 2 is configured so that the dispatch order computer 21, a claim reception computer 22, a customer information database 23, a customer service member information database 24, a claim database 25, and a task report database 26 are connected to one another via a LAN 27.

The claim reception computer 22 is for receiving claims from customers, and one set of a display 22a and a keyboard 22b is allocated to each reception operator that handles telephone calls from customers. Each reception operator uses the keyboard 22b to input data on the screen that is displayed on the display 22a while the operator handles telephone calls from customers. The claim data that are input are sent to the claim database 25 from the claim reception computer 22 and stored.

The customer information database 23 stores information on each customer (customer information). An example of customer information that is stored in the customer information database 32 is schematically shown in FIG. 2. As shown in FIG. 2, the items that are included in the customer information include the customer name, customer code, customer address, customer position information (customer at xxx longitude and yyy latitude), telephone number, and model and device ID number of the measuring device used by that customer. It should be noted that the items included in the customer information are not limited to these, and any other information that pertains to the customers also may be included.

It should be noted that the customer location refers to the location at which the customer is to be provided with service by a customer service member, and in the case of the present embodiment, this is the location where that customer has set up and uses the measuring device. The customer code is a code that is uniquely assigned to each customer for the purpose of identifying the customers. Also, the device ID number is a number that has been uniquely assigned to each measurement device.

Also, as schematically shown in FIG. 3, the customer service member database 24 stores information on each customer service member, including his name, customer service member code, the contact address of his terminal device 1 (telephone number and electronic mail address), and the latest position information and event information, for example, sent from his terminal device 1. It should be noted that the items that are included in the customer service member information are of course not limited to these.

The customer service member code is a code that is uniquely assigned to each customer service member. As will be described later, the position information and the event information are transmitted to the claim processing system 2 at a predetermined timing from the terminal device 1 of each customer service member.

The claim database 25, as mentioned above, stores the claim data created in accordance with the content that is input by an operator of the claim reception computer 22 when a claim is received from a customer. The task report database 26 stores task reports from customer service members who have responded to customer claims. It should be noted that task reports are transmitted to the claim processing system 2 by the customer service members inputting the content of the task to their terminal device 1 after proceeding to the customer and performing a task.

Next, the configuration and the operation of the terminal devices 1 are described.

Figure 4:
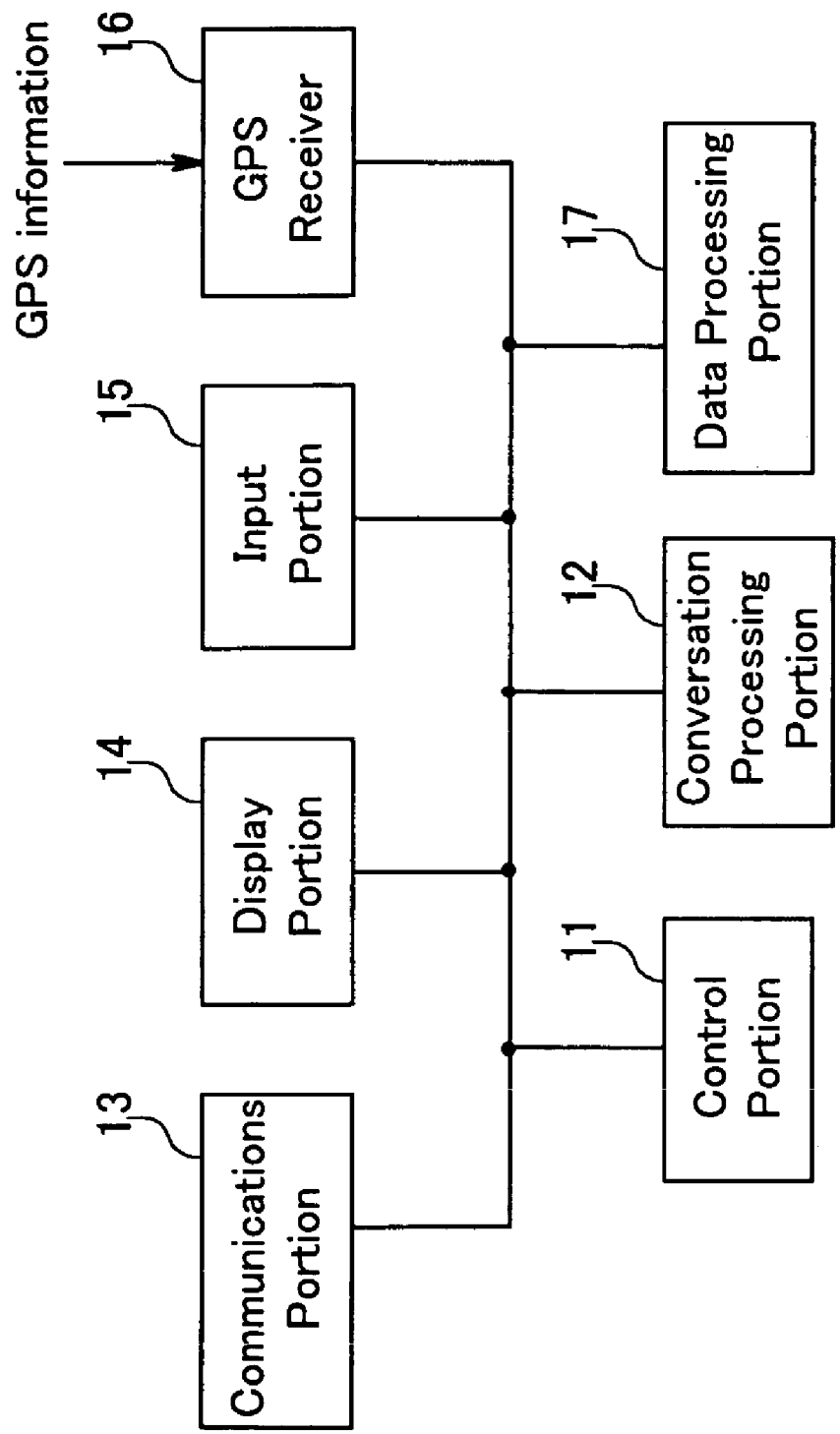
FIG. 4 is a block diagram showing the configuration of the terminal devices held by each customer service member in the dispatch support system.

FIG. 4 is a block diagram showing a schematic configuration of the terminal devices 1. As shown in FIG. 4, the terminal devices 1 are provided with a control portion 11, a conversation processing portion 12, a communications portion 13, a display portion 14, an input portion 15, a GPS receiver 16 (position information retrieval portion), and a data processing portion 17.

The control portion 11 controls the overall operation of the terminal device 1. The conversation processing portion 12 allows the terminal device 1 to function as a portable telephone, and enables conversation with other terminal devices 1 or with other subscribing telephones, for example, via the communications portion 13 and the wide-area communications network 10. The display portion 14 performs a variety of displays on a liquid crystal display 1a (see FIG. 1) of the terminal device 1. The input portion 15 receives event information or the like that is input by the customer service member. The data processing portion 17 processes input data that are obtained through the input portion 15 or data that are received via the communications portion 13.

Figure 5:
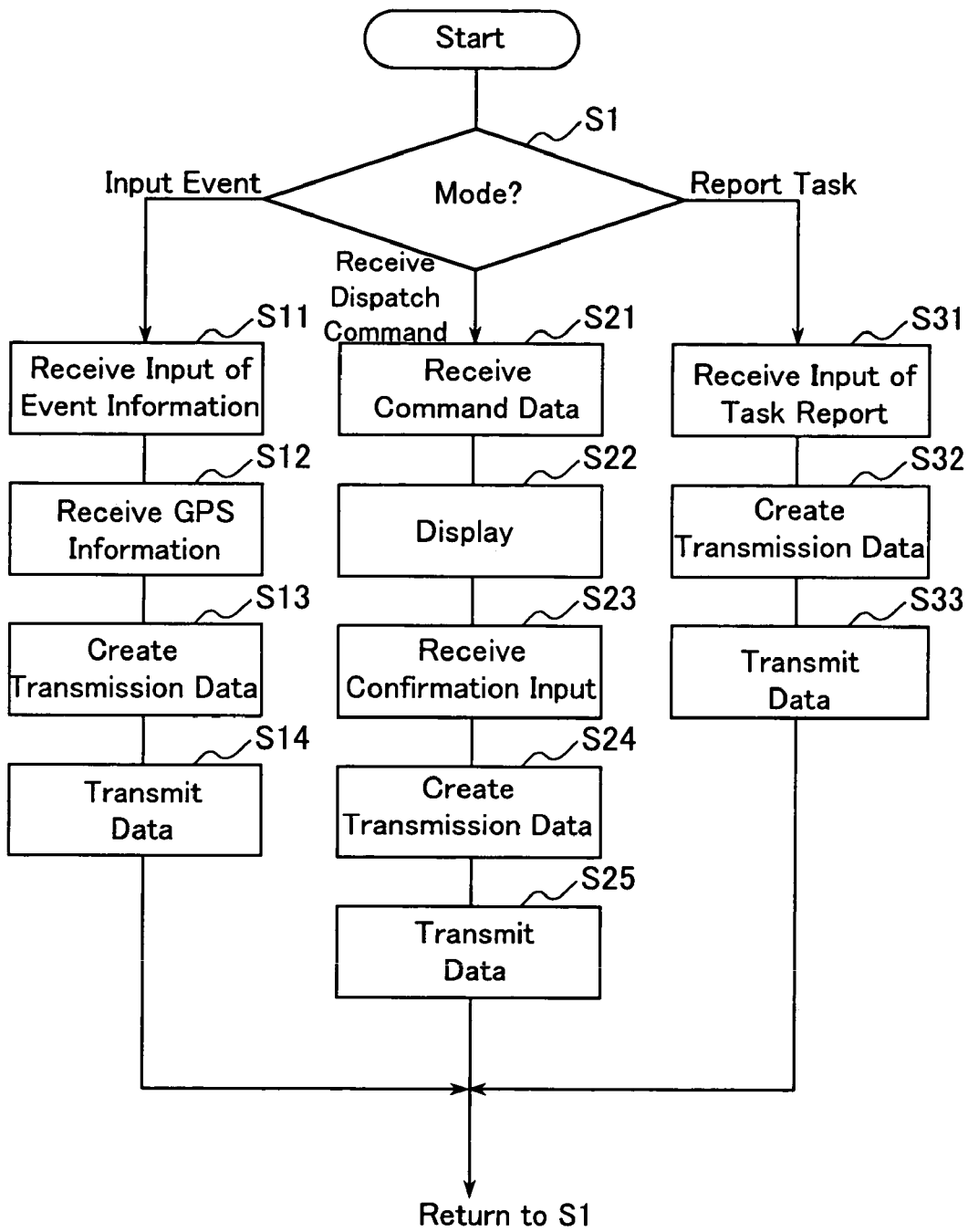
FIG. 5 is a flowchart showing the procedure of the operation of the terminal devices.

FIG. 5 is a flowchart showing the operation of the terminal device 1. It should be noted that of the operation modes of the terminal device 1, FIG. 5 illustrates only the three modes "input event," "receive dispatch command," and "report task," however, the operation modes of the terminal device 1 are not limited to these. For example, in addition to these three modes, the terminal device 1 can for example also have a mode for functioning as a portable telephone, a mode for creating work estimates to submit to the customer, and a mode for sending and receiving electronic mail.

First, the operation of the "input event" mode will be described. The process of the "input event" mode is executed by customer service members so as to notify the customer support center before they start a predetermined event, such as before starting to work at the customer location, before taking a break, or before changing locations. When the customer service member selects and executes "input event" from the menu screen of the terminal device 1, the control portion 11 detects this through the input portion 15 and advances the process from step S1 to step S11.

In step S11, the control portion 11 sends a command to the input portion 15 to make it receive the input of event information by the customer service member. At this time, the control portion 11 sends a command to the display portion 14 to display a screen listing the event information on the liquid crystal display 1a. The customer service member selects and inputs the event information that expresses his status from this list.

Next, the control portion 11 sends a command to the GPS receiver 16 to make it retrieve GPS information representing the current location of the terminal device 1 (step S12). Then, the control portion 11 sends a command to the data processing portion 17, making it create transmission data that include the event information input in step S11, the GPS information that are obtained in step S12, and the customer service member code indicating the customer service member (step S13).

Under the control of the control portion 11, the data that are created are sent from the data processing portion 17 to the communications portion 13 and are transmitted to the dispatch order computer 21 via the wide-area communications network 10 (step S14). It should be noted that it is possible to use electronic mail or the like as the transmission means of step S14. When the data transmission of step S14 is over, the control portion 11 returns the procedure to step S1.

Next, the operation of the "receive dispatch command" mode will be described. The process of the "receive dispatch command" mode is a process in which a customer service member to be dispatched to the customer is selected in the customer support center, and the process is executed on the terminal device 1 when a dispatch command has been transmitted to the terminal device 1 of that customer service member. Although described later, it should be noted that the above-mentioned dispatch command is transmitted from the dispatch order computer 21 of the customer support center to the terminal device 1 of the customer service member through electronic mail or the like.

When the control portion 11 detects that there has been a dispatch command from the dispatch order computer 21, it sends a command to the communications portion 13 to receive the dispatch command data (step S21). Next, the control portion 11 sends a command to the display portion 14 to obtain the dispatch command data that were received by the command portion 13 and displays the content of the data on the liquid crystal display 1a (step S22).

It is desirable for the customer support center to confirm that the customer service member to whom it transmitted the dispatch command data has agreed to the dispatch command. Thus, the control portion 11 sends a command to the display portion 14 to display, on the liquid crystal display 1a, a message or the like urging the customer service member to carry out confirmation input to confirm that he has agreed to the dispatch command.

When the customer service member carries out the confirmation input by responding to this message, the input portion 15 receives this input (step S23), and under the control of the control portion 11, the data processing portion 17 creates transmission data for transmitting the confirmation input to the dispatch order computer 21 (step S24). It should be noted that the customer service member code for identifying the customer service member is attached to the transmission data as well.

The data that are created are sent to the communications portion 13 from the data processing portion 17 under the control of the control portion 11, and are transmitted to the dispatch order computer 21 over the wide-area communications network 10 (step S25). It should be noted that electronic mail or the like can be used as the transmission means of step S25. When the data transmission of step S25 is over, the control portion 11 returns the procedure to step S1.

Next, the operation of the "report task" mode will be described. The process of the "report task" mode is executed when the customer service member that is dispatched to the customer reports the content of his task to the customer support center after he has finished his task. When the customer service member selects' and executes "report task" from the menu screen of the terminal device 1, the control portion 11 detects this through the input portion 15 and advances the procedure from step S1 to step S31.

In step S31, the control portion 11 sends a command to the input portion 15 to receive the input of the task report by the customer service member. Next, in order to send the task report that is input in step S31 to the dispatch order computer 21, the control portion 11 sends a command to the data processing portion 17 to create transmission data by attaching the customer service member code to the task report (step S32).

The data that are created are sent to the communications portion 13 from the data processing portion 17 under the control of the control portion 11, and are transmitted to the dispatch order computer 21 over the wide-area communications network 10 (step S33). It should be noted that electronic mail or the like can be used as the transmission means of step S33. When the data transmission of step S33 is over, the control portion 11 returns the procedure to step S1.

When the dispatch order computer 21 receives the task report from the terminal device 1, it converts the task report that is received to a format that is suitable for storage in the task report database 26 and sends it to the task report database 26, storing it there. Although described later, it should be noted here that when the customer service member performs tasks at the customer location, the task report data that are stored in the task report database 26 are used as reference cases for improving work efficiency.

FIG. 6 schematically shows an example of task report data stored in the task report database 26. As shown, the task report data stored in the task report database 26 include the customer service member code of the customer service member in charge of the task, the reception number of the claim serving as the grounds for the task, the customer code, the model and device ID of the measuring device to which the task is performed, the type and content of the claim, and the cause for the claim and the method of response to the claim. It should be noted that the items included in the task report data are not limited to these, and it is also possible to freely include other items, such as the error code in a case where the claim is mechanical failure.

Next, the processing procedure, for example, of the present customer service support system in a case where a claim is made by a customer is described with reference to FIGS. 7 to 13.

A customer using the measuring device contacts the customer support center of the manufacturer of the measuring device by telephone if the measuring device is broken or if he has a question regarding how to use it, for example. In the customer support center, a reception operator handles the telephone call from the customer, asks the customer's name, address, and telephone number, the model and the device ID of the measuring device used by the customer, and the nature of the claim, and inputs these to the claim reception computer 22.

It should be noted that of these items, it is not absolutely necessary that the operator ask and input all the items other than the nature of the claim. This is because customer information on all customers is stored in the customer information database 23, as mentioned earlier, and thus as long as at least one item that can be used to identify the customer (for example, his name or telephone number) is acquired from the customer, it is possible to obtain other items of the customer information from the customer information storage portion 25.

Figure 7:
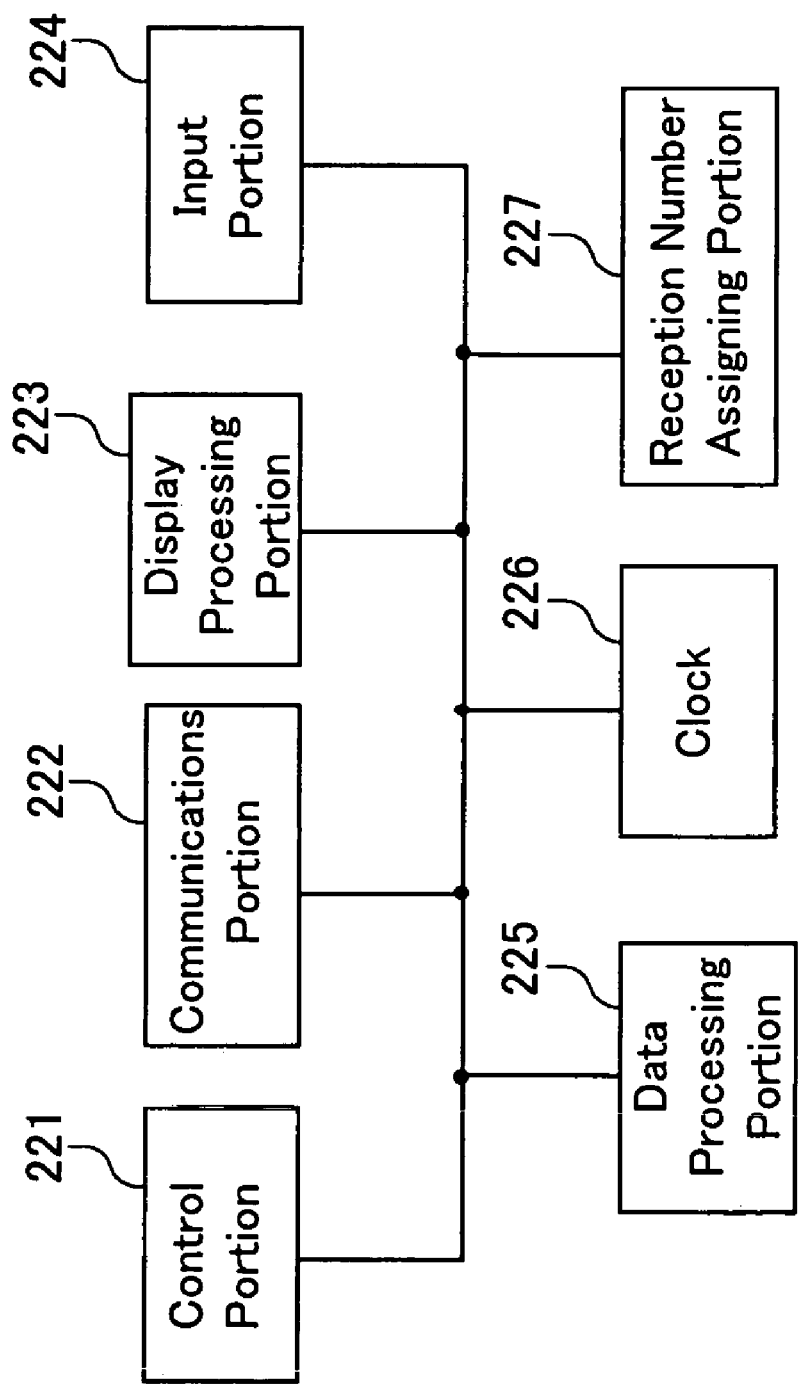
FIG. 7 is a block diagram showing the functional configuration of a claim reception computer provided in the claim processing system.

Here, FIG. 7 shows a functional configuration of the claim reception computer 22. The claim reception computer 22 is provided with a control portion 221, a communications portion 222, a display processing portion 223, an input portion 224, a data processing portion 225, a clock 226, and a reception number assigning portion 227.

The control portion 221 controls the overall operation of the claim reception computer 22. The communications portion 222 sends and receives data to and from the dispatch order computer 21 and the customer information database 23, for example, via the LAN 27. The display processing portion 223 controls the screen display of the display 22*a*. The input portion 224 receives key input from the keyboard 22*b*. The data processing portion 225 processes data or the like received by the input portion 224. The clock 226 is provided to obtain date and time information. The reception number assigning portion 227 assigns a unique number to each claim that is received by the reception operator.

FIG. 8 shows an example of the customer claim reception screen that is displayed on the display 22*a* of the claim reception computer 22 by the display processing portion 223. The reception operator calls up the customer claim reception screen when a claim is received from a customer by telephone. At this time, the display processing portion 223 obtains date and time information from the clock 226 and obtains a reception number from the reception number assigning portion 227, and displays these on a reception time field 51 and a reception number field 52.

In a claim type check field 53, the reception operator clicks one of a claim regarding maintenance or repair of the measuring device (machine claim), a business-related claim regarding the contract or the like (business-related call), and a question regarding the operation, for example, of the measuring device (technical inquiry), to correspond to the nature of the telephone call from the customer.

The model name of the customer's measuring device is input to a model field 54 and the device ID of the customer's measuring device is input to an input ID field 55. It should be noted that the model field 54, for example, is provided with a button 54*a* for displaying a pull-down menu, on which a list of the device model names provided by the manufacturer is displayed, so that the model can be selected from this list.

To a customer claim location input field 56 are input the state in which the customer resides, customer name, customer code, address, telephone number, department name, name of technician in charge, and extension number. As described earlier, it should be noted that it is possible to adopt a configuration in which only information that allows a customer to be uniquely determined (such as customer name or telephone number) are required input items, and other items may be obtained from the customer information database 23.

If the type of customer claim is a "machine claim," then that information is input to a claim content input field 57. The response speed for the claim is input to a response speed input field 58.

When the input of data to the customer claim reception screen is over, then, under the control of the control portion 221, the data processing portion 225 converts the data that are input into claim data having a format that is suited for storage in the claim database 25, and sends them to the claim database 25, via the communications portion 222, storing them there.

Here, FIG. 9 schematically shows an example of claim data created by the data processing portion 225 and stored in the claim database 25. As shown, the claim data include, the reception date and time, reception number, customer code, model and device ID of the measuring device, claim type, claim content, and response speed, for example, for each claim from a customer. It should be noted that the items included in the claim data are not limited to these.

Also, if the response speed for the claim that is input to the response input field 58 is "urgent," then the control portion 221 sends dispatch request data to the dispatch order computer 21 to report that a claim requiring an immediate response has been received. The dispatch request data include the customer code and the reception number of the claim. As is described below, when the dispatch order computer 21 receives the dispatch request data it starts a process for dispatching a customer service member to the customer location from which the claim was made.

Hereinafter, the process through which the dispatch order computer 21 dispatches a customer service member is described in detail.

Figure 10:
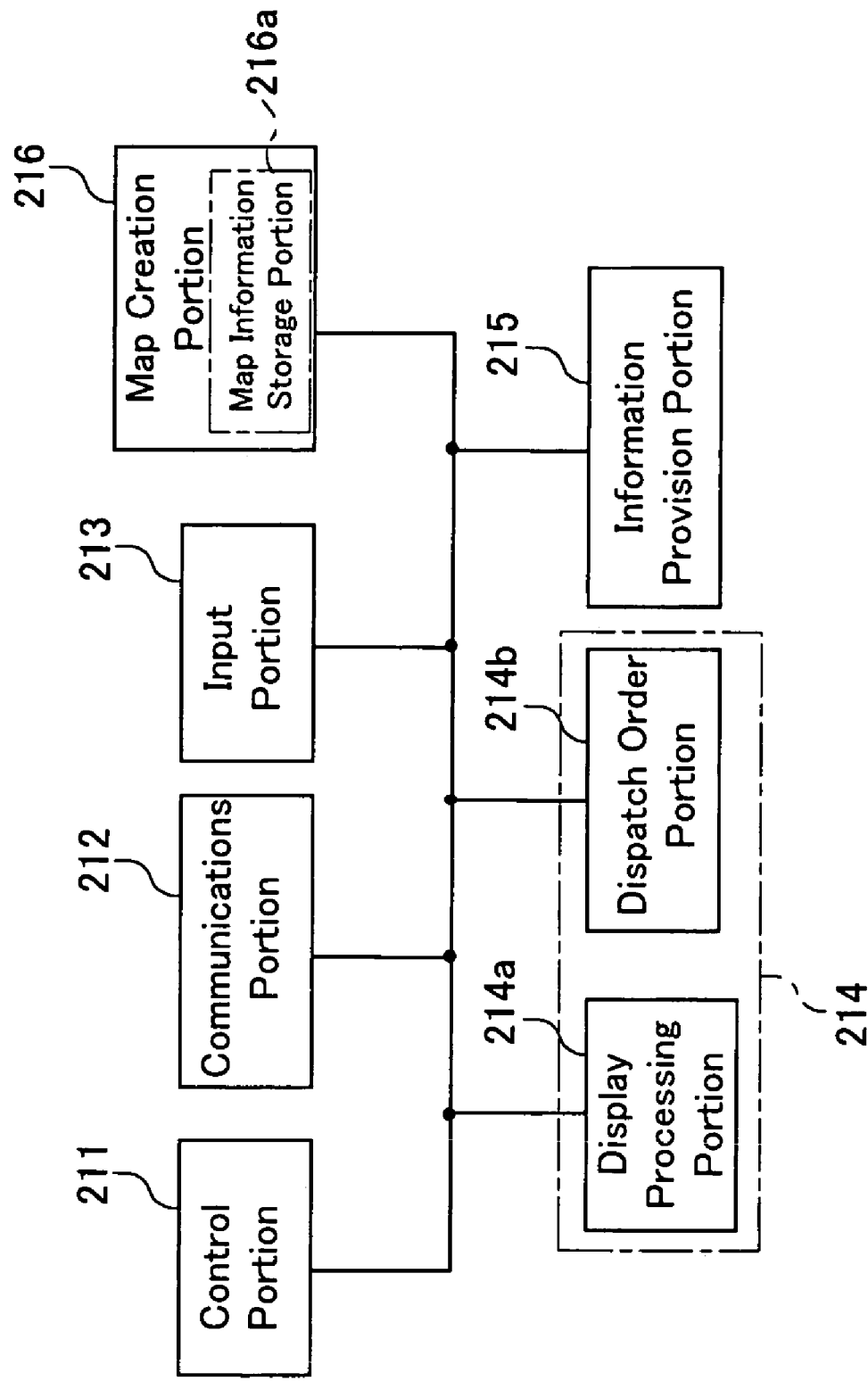
FIG. 10 is a block diagram showing the functional configuration of a dispatch order computer provided in the claim processing system.

First, the configuration of the dispatch order computer 21 is shown in FIG. 10. The dispatch order computer 21 is provided with a control portion 211, a communications portion 212, an input portion 213, a support processing portion 214, an information provision portion 215, and a map creation portion 216.

The control portion 211 controls the overall operation of the dispatch order computer 21. The communications portion 212 sends and receives data to and from the claim reception computer 22 and the customer information database 23, for example, via the LAN 27. The input portion 213 receives key input from the keyboard 21b.

The support processing portion 214 is for carrying out a process for supporting the selection of a customer service member to dispatch to the customer, and in this embodiment includes a display processing portion 214a for controlling the display state of the display 21a and a dispatch order portion 214b for sending dispatch orders to customer service members that are selected by the operator.

The information provision portion 215 extracts useful information for the task, for example, of the customer service member (dispatch staff member information) from past task report data stored in the task report database 26, and provides this to the terminal device 1 of the customer service member. The map creation portion 216 includes a map information storage portion 216 storing map image information, and is for creating map image information of a predetermined region around the customer location.

Figure 11:
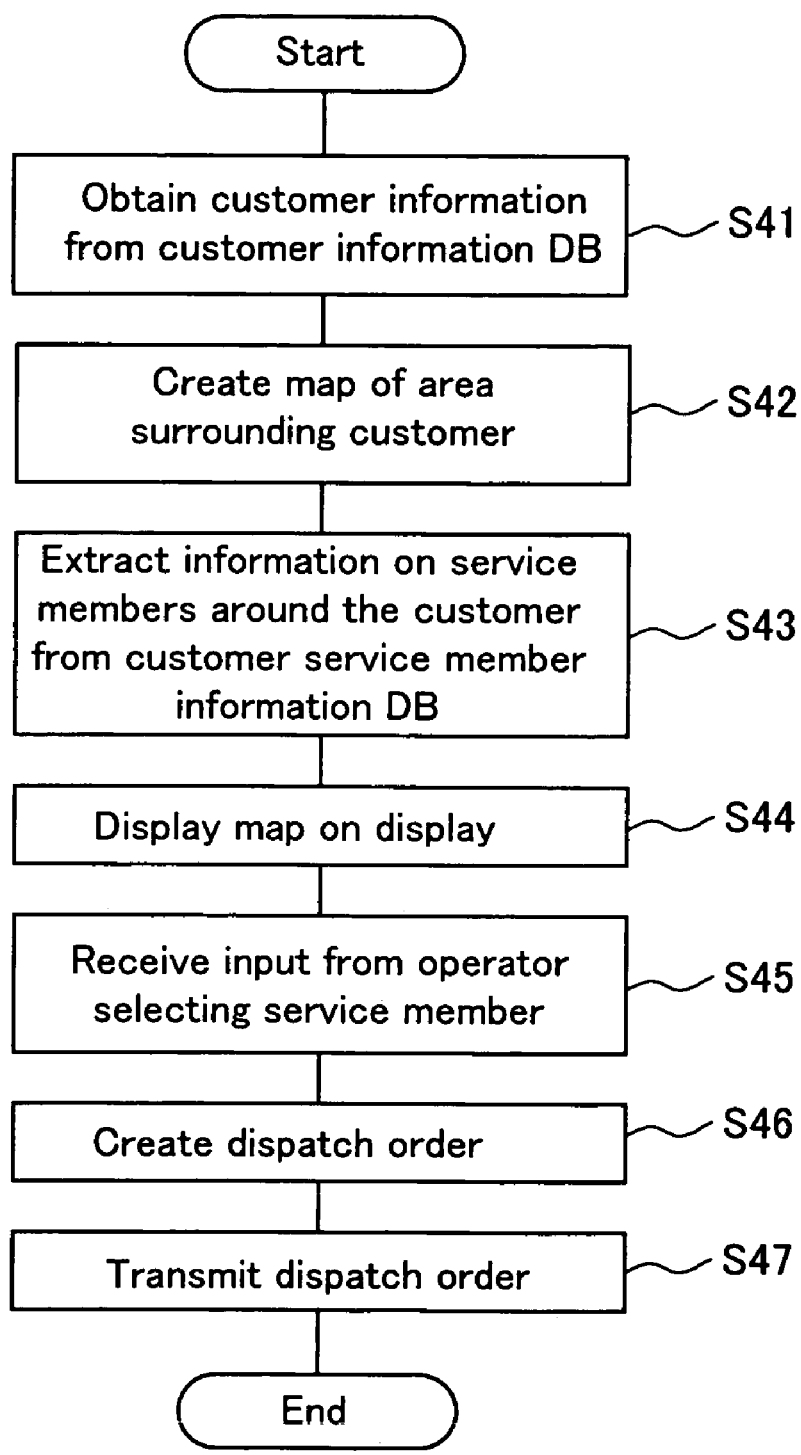
FIG. 11 is a flowchart showing the procedure of the operation of the dispatch order computer.

FIG. 11 is a flowchart showing the operation of the dispatch order computer 21.

When the control portion 211 of the dispatch order computer 21 receives the above-mentioned dispatch request data from the claim reception computer 22, it first sends a command to the communications portion 222 to access the customer information database 23 using the customer code included in the dispatch request data as a search key and obtain the customer information for that customer (step S41).

Next, the control portion 211 sends a command to the map creation portion 216 to create map image information for displaying a map of a predetermined region around the customer on the display 21a (step S42). The map creation portion 216 extracts the position information (latitude and longitude) of the customer from the customer information obtained in step S41, and based on this position information, obtains map image information of a predetermined region around the customer from the map information storage portion 216a.

It should be noted that in step S42 it is preferable that the map information creation portion 216 creates map image information so that the customer is located in the center of the screen of the display 21a. For example, when the longitude and latitude of the customer are (x, y), this can be achieved by obtaining map image information for a region in which the longitude is the range of $x \pm \alpha$ and the latitude is the range of $y \pm \beta$, where $\alpha$ and $\beta$ are predetermined degrees, from the map information storage portion 216a.

Thus, by displaying the customer location in the center of the screen of the display 21a, the operator of the dispatch order computer 21 can ascertain the positional relationships between the customer and each customer service member in a single glance without scrolling the screen, making selection of a customer service member to be dispatched easy.

Also, the control portion 211 orders the communications portion 212 to access the customer service member information database 24 and extract information on which of all the customer service members are in a predetermined region around the customer (step S43). This can be achieved by extracting the position information (longitude X, latitude Y) included in the customer service member information from the customer service member information database 24 so that $$x-\alpha \leq X \leq x+\alpha$$

and $$y-\beta \leq Y \leq y+\beta$$

if the predetermined region around the customer has a longitude in the range of $x \pm \alpha$ and a latitude in the range of $y \pm \beta$ as mentioned above.

Next, the control portion 211 sends the map image information and the customer service member information obtained in step S42 and step S43 to the display processing portion 214a and displays them on the display 21a (step S44). The display processing portion 214a displays a map of the area surrounding the customer on the display 21a based on the map image information, and based on the customer service member information, displays markings representing each customer service member in the area around the customer at the locations of the customer service members on the map that is displayed on the display 21*a*.

Figure 12:
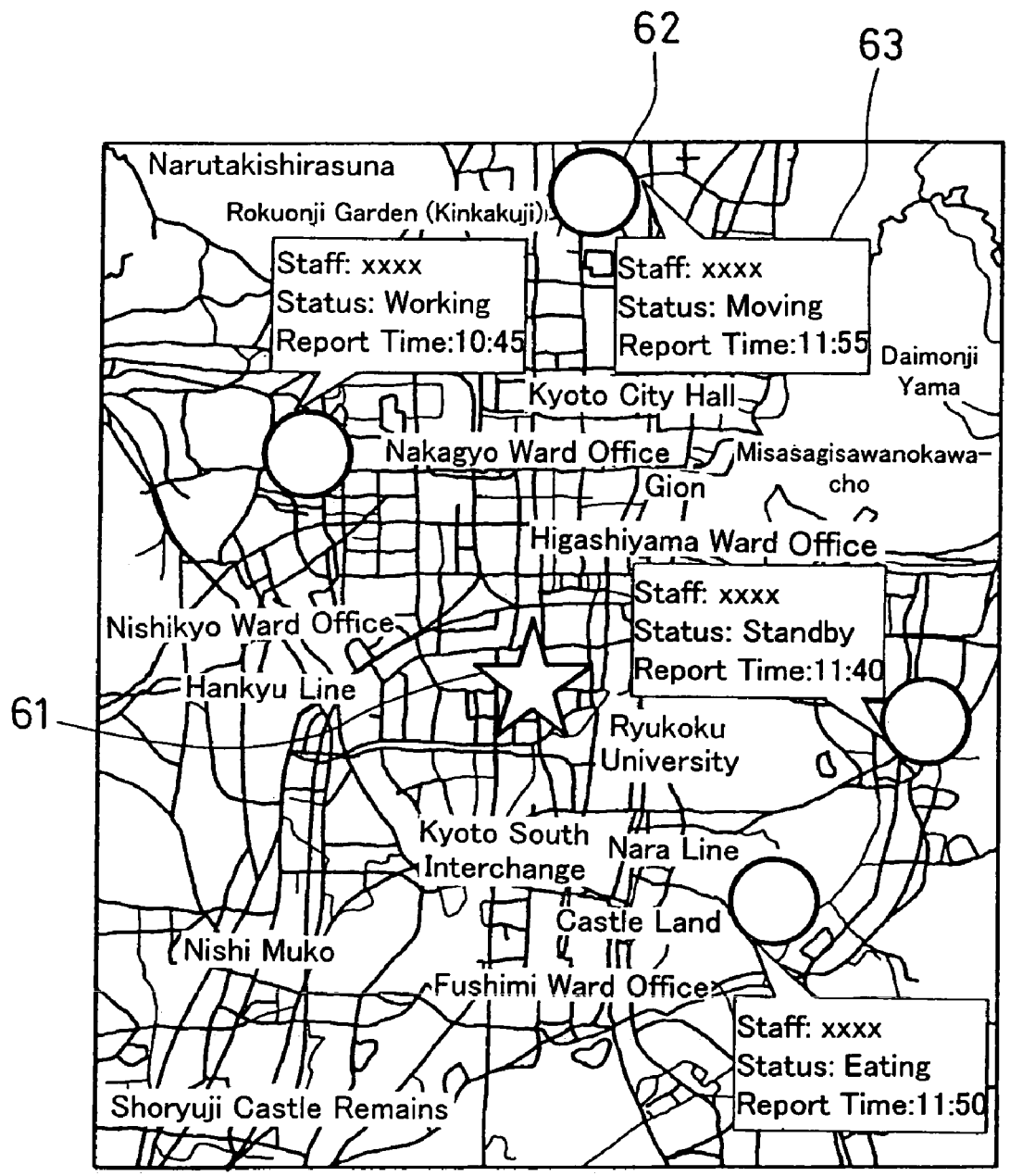
FIG. 12 is a diagram showing an example of a map of the area surrounding the customer that is displayed on the display of the dispatch order computer.

Here, an example of the display state of the display 21*a* resulting from the processing of step S44 is shown in FIG. 12. In FIG. 12, a star-shaped marking 61 displayed in the center of the screen of the display 21*a* represents the location of the customer. Circular markings 62 each represent the location of a customer service member in the vicinity of the customer, and balloon graphics 63 shown next to the circular markings 62 represent the current status of each customer service member.

The name of staff in charge, status, and report time shown in the balloon graphics 63 are extracted from the customer service member information obtained from the customer service member information database 24 in step S43 and displayed by the display processing portion 214*a* in step S44.

It should be noted that the example screen shown in FIG. 12 is only one example, and various changes can be made to the appearance of the display on the display 21*a*. For example, FIG. 12 shows all the customer service members that are in the area around the customer, but conceivably the display could be limited to customer service members that can be dispatched (for example, customer service members with no tasks scheduled next). Also, FIG. 12 shows the status of the customer service members using the balloon graphics 63, however, another conceivable approach is to assign different colors to the circular markings 62 representing the customer members to correspond to the status of the customer service members.

As shown above, by displaying on the display 21*a* the location and the status of customer service members in the area around the customer, the operator of the dispatch order computer 21 can select the customer service member who can most quickly reach the customer. By for example clicking the circular marking 62 representing the selected customer service member on the display 21, the operator can input the fact that the customer service member has been selected.

The control portion 211 receives the input of the operator selecting a customer service member via the input portion 213 (step S45), and sends a command to the dispatch order portion 214*b* to create a dispatch order for the selected customer service member (step S46). Under the control of the control portion 211, the dispatch order that is created is sent to the communications portion 212 and is then transmitted to the terminal device 1 of the selected customer service member through electronic mail or the like (step S47). It should be noted that the address for the dispatch order (electronic mail address of the terminal device 1 of the customer service member) is obtained from the customer service member information database 24.

It should be noted that in step S46, the dispatch order portion 214*b* includes the customer information obtained in step S41 in the dispatch order. Also, the dispatch order portion 214*b* accesses the claim database 25 via the communications portion 212, using the claim reception number included in the dispatch request data from the claim reception computer 22 as the search key, to obtain the content of the claim, and includes this in the dispatch order.

Thus, the customer service member that receives the dispatch order can obtain information relating to the dispatch location (customer location) and the content of the claim. Also, for example, the customer information included in the dispatch order includes position information on the customer location (longitude and latitude), so that if the terminal device 1 of the customer service member is given a navigation function, then that position information can be used to determine the route to the customer and the time required, for example.

It should be noted that in step S46 it is preferable that information useful for the task at the customer location (dispatch staff member support information) is added to the dispatch order that is created by the dispatch order portion 214*b*. This information is extracted from the task report data, which are stored in the task report database 26, by the information provision portion 215, and is for example a record of past service at that customer location, such as the content of the action performed to counter past trouble with the measuring device at the customer location.

Thus, work efficiency is improved because the customer service member can perform his task with reference to past cases. Also, even if a different customer service member from last time is dispatched, the past case can be referenced so as to maintain a constant quality of service for the customer.

It should be noted that the information also may be a record of the procedure performed at another customer location for a case that is identical to the current claim. Accordingly, this is advantageous because it for example allows the approach to problems occurring at different customer locations using the same measuring device to be referenced, which increases the work efficiency of the customer service members, and by sharing information among all the customer service members, the quality of service to the customer can be improved.

Also, it is preferable that the customer service member who has received a dispatch order inputs his expected time of arrival at the customer location to which he is dispatched into his terminal device 1, and transmits this to the dispatch order computer 21. It should be noted that the expected time of arrival can be estimated not only through a subjective assessment by the customer service member but also by the GPS function of the terminal device 1. Also, a system in which the time of arrival is estimated by. providing the terminal device 1 with a VICS (vehicle information and communication system) compatible function may also be adopted.

Thus, the expected time of arrival is transmitted to the dispatch order computer 21, and by communicating the expected time of arrival at the customer either through the dispatch order computer 21 or the operator of the dispatch order computer 21, customer service can be improved.

The above description was made using an example in which the addresses or the like of customers are stored in the customer information database 23 in advance, and when there is a claim from a customer, information on that customer's address or the like is obtained from the customer information database (see step S41), however, it is also possible to obtain position information on the customer location through a position information system, such as the one that will be described in detail in the second embodiment, that is, the address or the like of the customer can be obtained based on the sender telephone number of the customer.

Also, in the above description, in step S45 the operator selected a customer service member to be dispatched after viewing the display on the display 21*a*, however, it is also possible for the dispatch order computer 21 to perform the process of selecting a dispatchable customer service member. It should be noted that it is not necessary for the dispatch order computer 21 to always specify a single customer service member to be dispatched, and a process such as narrowing down candidates being performed by the dispatch order computer 21 with the final decision made by an operator may be used.

Figure 13:
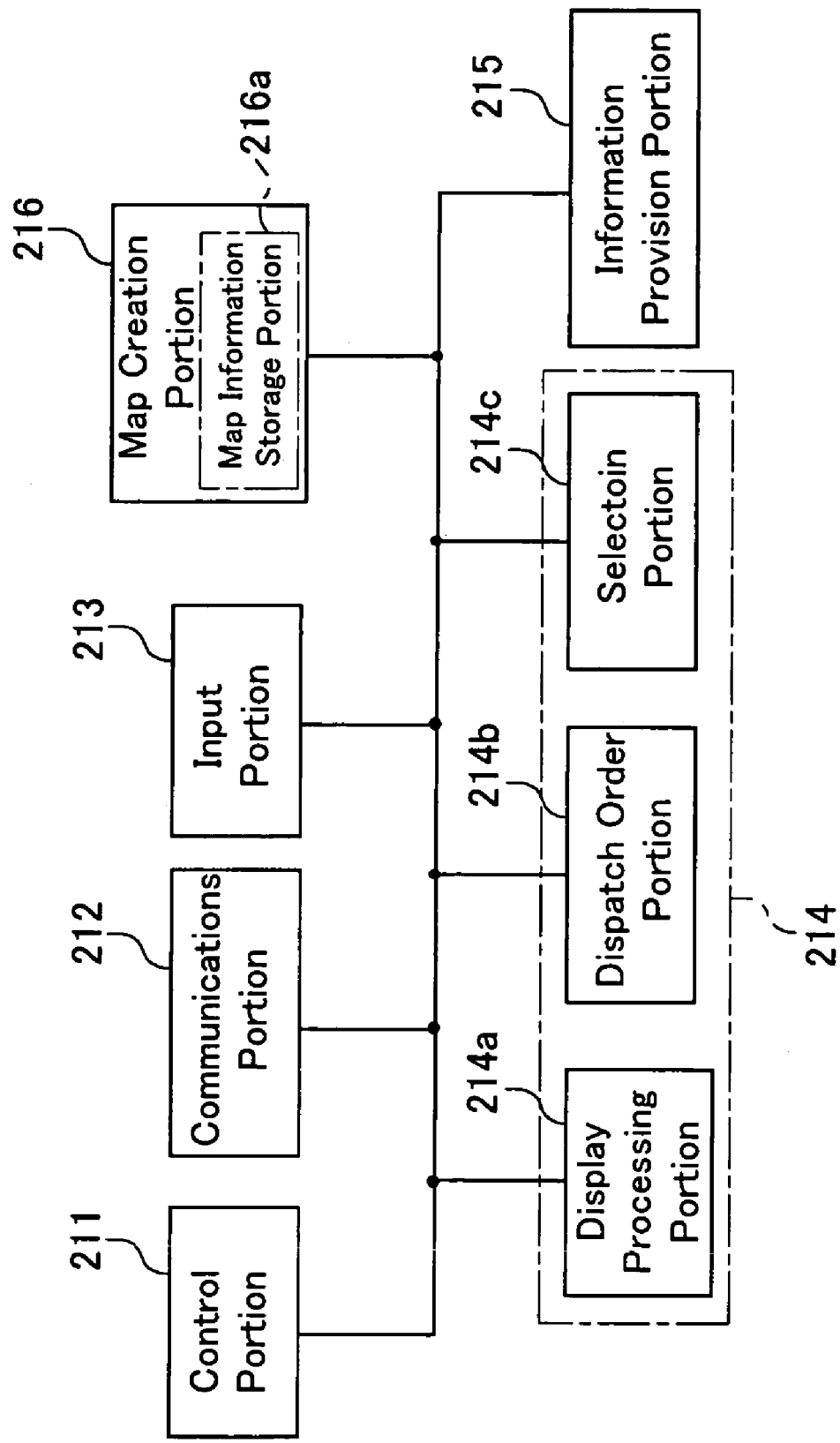
FIG. 13 is a block diagram showing a modified example of the configuration of the dispatch order computer.

In this case, the support processing portion 214 is provided with a selection portion 214c for selecting customer service members to be dispatched, as shown in FIG. 13. The selection portion 214c selects customer service members that can be dispatched to the customer location based on the position information and the event information of each customer service member, which are included in the customer service member information stored in the customer service member information database 24.

As described in the foregoing, the customer service support system of the present embodiment allows the position and the current status of each customer service member to be determined in the customer support center because the position information of the customer service members and the event information showing the state of the customer service members are sent to the claim processing system 2 through the terminal devices 1 carried by the customer service members. This allows the customer support center to select the customer service member that can arrive at the customer location the quickest.

It should be noted that the embodiment described above does not limit the present invention, and can be altered in various ways within the scope of the present invention.

For example, in the above example, the dispatch staff members were selected based on only their position information and their current status, however, other conditions in addition to these conceivably also could be taken into account. For example, items such as the qualifications and the skill level of each customer service member may be added to the customer service member information stored in the customer service member information database 24, and these items can be used to select customer service members that are capable of handling the claim from the customer.

Furthermore, the claim processing system 2 of the customer service center was illustratively shown including two computers and various databases connected by a LAN, however, the physical configuration of this system is not limited to this example, and the system may be a more dispersed system or alternatively may be a concentrated system that employs a mainframe computer (host computer). Also, the positioning system was illustratively described using a GPS, however, it may also use a PHS (personal handyphone system), for example.

Moreover, the above embodiment was described using an example in which the terminal devices 1 transmit event information together with position information to the claim processing system 2 with each instance that the customer service members input event information. However, the method for transmitting the position information and the event information is not limited to this.

For example, a configuration can be adopted in which the terminal devices 1 periodically transmit only position information and transmit event information each time event information is input. Alternatively, rather than the terminal devices 1 automatically performing a transmission to the claim processing system 2, the claim processing system 2 can send periodic requests for the transmission of position information to the terminal devices 1, which receive these transmission requests and transmit position information.

Also, it is not absolutely necessary that the terminal devices 1 are provided with a portable telephone function, and for example may be achieved by a portable computer, such as a palm-top computer or a notebook computer.

Second Embodiment

Another embodiment of the present invention is described below with reference to the drawings.

Figure 14:
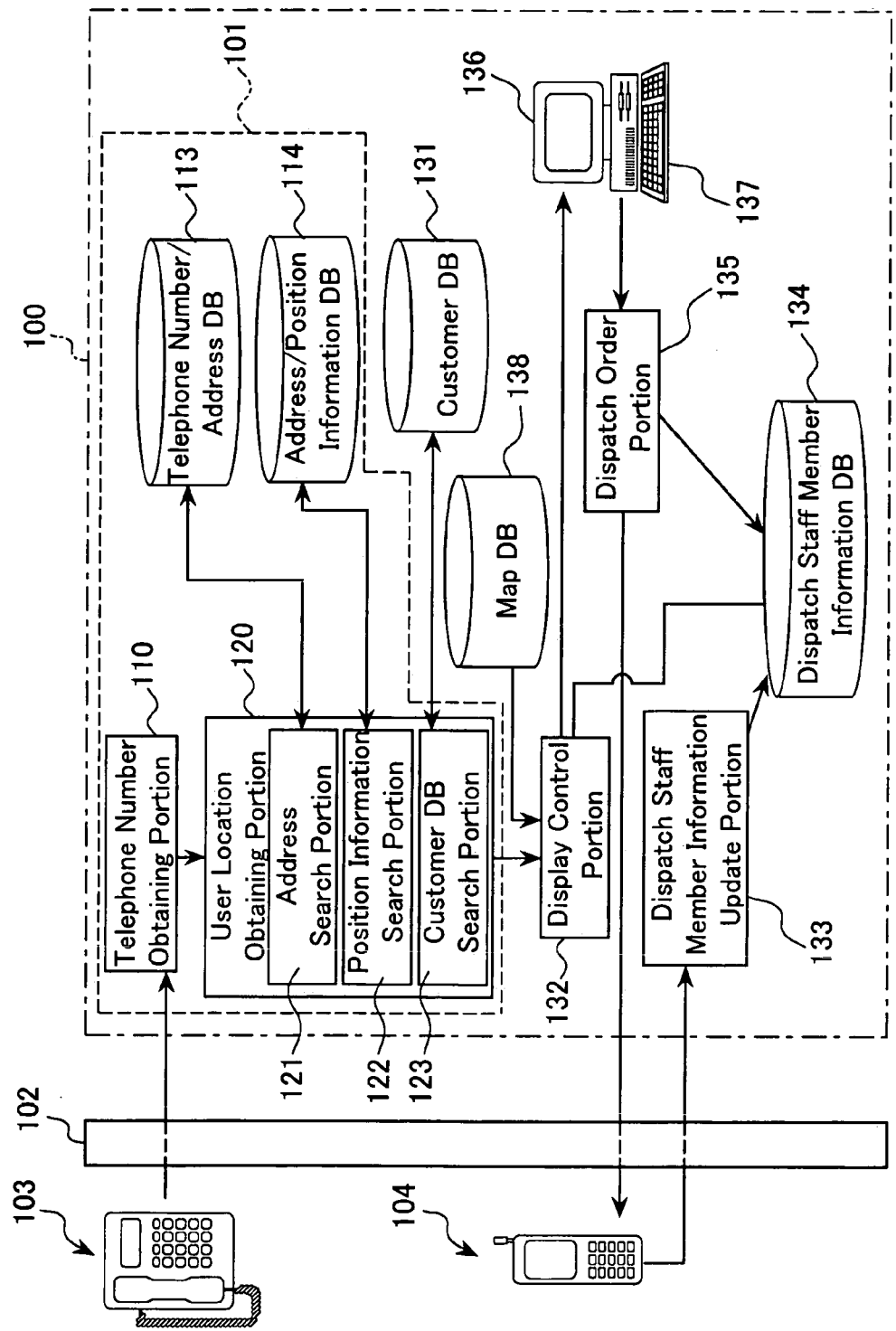
FIG. 14 is a block diagram showing the functional configuration of a dispatch support system according to a second embodiment of the invention.

As shown in FIG. 14, a position information system 101 makes up a portion (sub-system) of a customer service support system 100. The customer service support system 100 is a system run by the manufacturer of measuring devices, for example, and is used to quickly dispatch a sales representative or a repair service member or the like (hereinafter, referred to as "dispatch staff members") to a user of the device, for example, when a telephone call is received from the user.

The position information system 101 in the customer service support system 100 specifies the position information (latitude and longitude, for example) of the customer location based on his sender telephone number when a call is received from a telephone 103 of that customer through a telephone network 102. With the customer service support system 100, a map of the customer location is displayed on a display 136 based on the position information that is obtained by the position information system 101.

On this map are displayed the locations, for example, of dispatch staff members present in the vicinity of the customer, and by an operator viewing the map on the display 136 and selecting an appropriate dispatch staff member, a dispatch order is sent to a portable terminal 104 of the dispatch staff member that is selected.

It should be noted that each dispatch staff member transmits information on his current location and work status or the like (dispatch staff member information) at a periodic or appropriate timing using his portable terminal 104, so that the display 136 always can show the most recent status of the dispatch staff members.

The portable terminal 104 includes an electronic mail function in addition to a portable telephone function, and its electronic mail function is used to transmit information on the name of the dispatch staff member, his current location, and his current status to a dispatch staff member information update portion 133 of the customer service support system 100. It should be noted that the telephone network 102 includes a mobile communications network and allows communication between the customer service support system 100 as a fixed station and the portable terminals 104 as mobile stations.

Hereinafter, the configuration and the operation of the position information system 101 and the customer service support system 100 using the position information system 101 are described in detail with reference to the drawings.

FIG. 14 is a block diagram showing the functional configuration of the position information system 101 and the customer service support system 100 in which it is included.

As shown in FIG. 14, the customer service support system 100 is provided with the position information system 101, a customer database (DB) 131, a display control portion 132, the dispatch staff member information update portion 133, a dispatch staff member information database 134, a dispatch order portion 135, the display 136, an input device 137 such as a keyboard, and a map database 138.

The customer database 131 stores various types of information, including customer name, telephone number, customer address, and the position information (latitude and longitude, for example), on customers that have previously registered as users. The dispatch staff member information database 134 stores dispatch staff member information on each dispatch staff member, including information on that staff member's name, identification number, contact address (telephone number and electronic mail address) of his portable terminal 104, and the latest position information sent from the portable terminal 104 of that dispatch staff member.

The display control portion 132 displays a map on the display 136 based on the position information of the customer location that is obtained from the position information system 101, the dispatch staff member information, and the map images stored in the map database 138. The dispatch staff member information update portion 133 carries out a process for updating the information stored in the dispatch staff member information database 134 based on the most recent dispatch staff member information sent from the portable terminals 104 of the dispatch staff members.

The dispatch order portion 135 performs a process for transmitting a dispatch order to the portable terminal 104 of the dispatch staff member selected by the operator. Any display device can be used as the display 136, as long as it is capable of displaying images. The input device 137 is not limited to a keyboard, and any input device can be used as the input device 137. It should be noted that the display 136 and the input device 137 can be configured as a single unit, such as a touch-panel type display.

The position information system 101 is provided with a telephone number obtaining portion 110, a user location obtaining portion 120, a telephone number/address database 113, and an address/position information database 114.

The telephone number obtaining portion 110 uses the sender telephone number notification service provided by the telephone network 102 to obtain the telephone number of the telephone 103 of a customer when a call is received from the telephone 103, and outputs this to the user location obtaining portion 120. The telephone number/address database 113 stores telephone numbers and addresses corresponding to each telephone number, and is structured so that addresses can be specified using the telephone numbers as search keys. The address/position information database 114 stores addresses and position information (longitude and latitude, for example) on those addresses, and is structured so that position information can be specified using the addresses as search keys.

The user location obtaining portion 120 includes an address search portion 121, a position information search portion 122, and a customer database search portion 123, and uses the customer database 131, the telephone number/address database 113, and the address/position information database 114 to obtain position information on a customer location from the telephone number of that customer, which is obtained by the telephone number obtaining portion 110.

It should be noted that of the blocks mentioned above, the telephone number obtaining portion 110, the user location obtaining portion 120, the display control portion 132, the dispatch staff member information update portion 133, and the dispatch order portion 135 are achieved by a CPU operating according to predetermined programs. Also, the databases mentioned above are achieved by storage devices such as hard disks.

Figure 15:
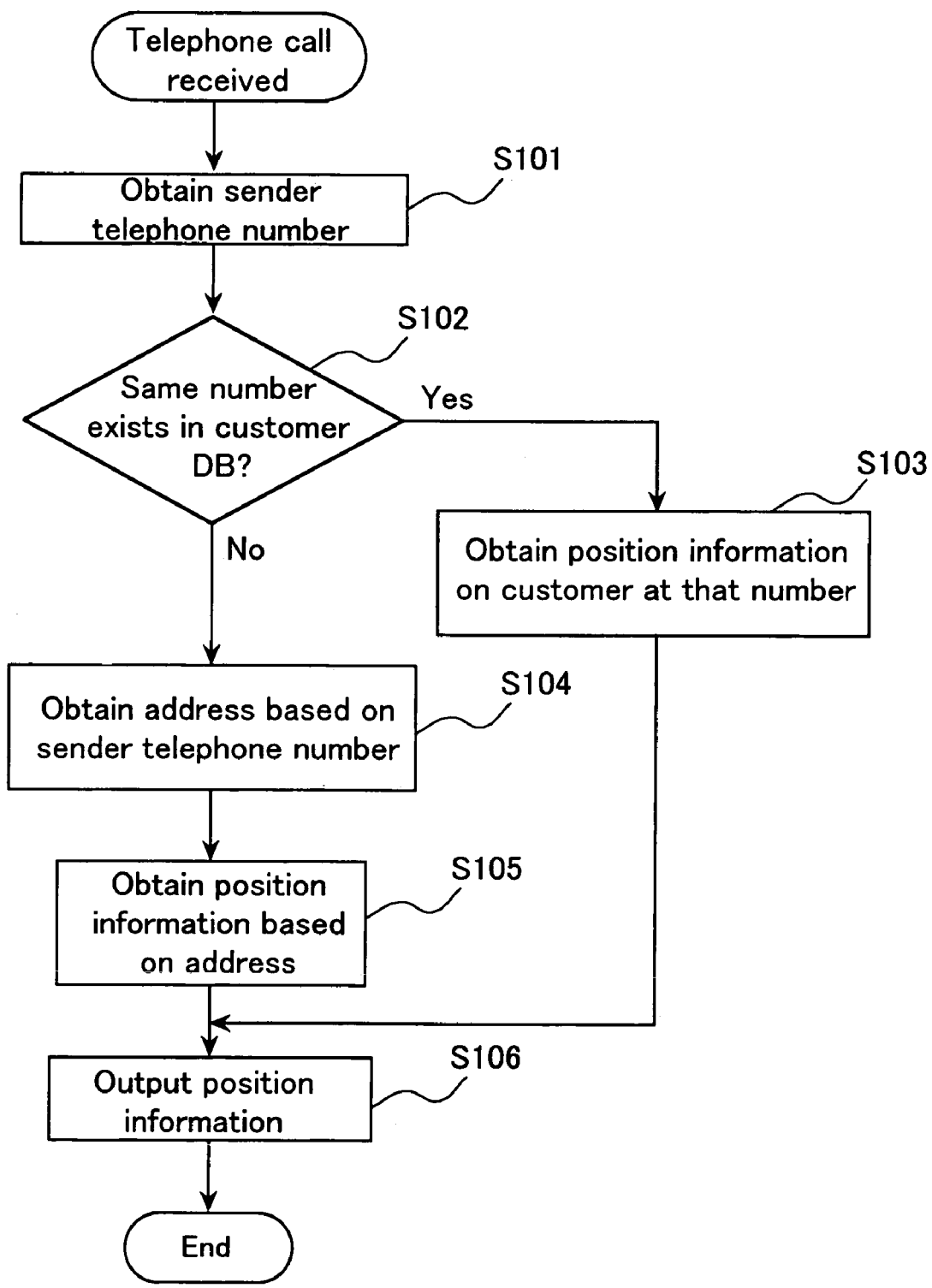
FIG. 15 is a flowchart showing the operation of the position information system that is included in the dispatch support system according to the second embodiment.

Here, the operation of the position information system 101 is described with reference to FIG. 15.

When a telephone call is received from the telephone 103 of a customer, then, as described above, the telephone number obtaining portion 110 uses the sender telephone number notification service provided by the telephone network 102 to obtain the telephone number of the telephone 103 of the customer (step S101). The telephone number that is obtained is passed on to the user location obtaining portion 120.

Next, in the user location obtaining portion 120, the customer DB search portion 123 searches the customer database 131 using the telephone number that is obtained in step S101 as the search key and determines whether data on that customer have already been registered (step S102). Here, if data on that customer have been registered (YES in step S102), then the position information (latitude and longitude, for example) of that customer is extracted from that record (step S103).

On the other hand, if the outcome in step S102 is NO, then first the address search portion 121 searches the telephone number/address database 113 using the telephone number obtained in step S101 as a search key, and extracts the address corresponding to that telephone number (step S104).

Next, the position information search portion 122 searches the address/position information database 114 using the address obtained in step S104 as a search key, and extracts the position information corresponding to that address (step S105).

Then, the user position information obtaining portion 120 outputs the position information obtained in step S103 or step S105 to the display control portion 132 (step S106), and the procedure is ended.

Figure 16:
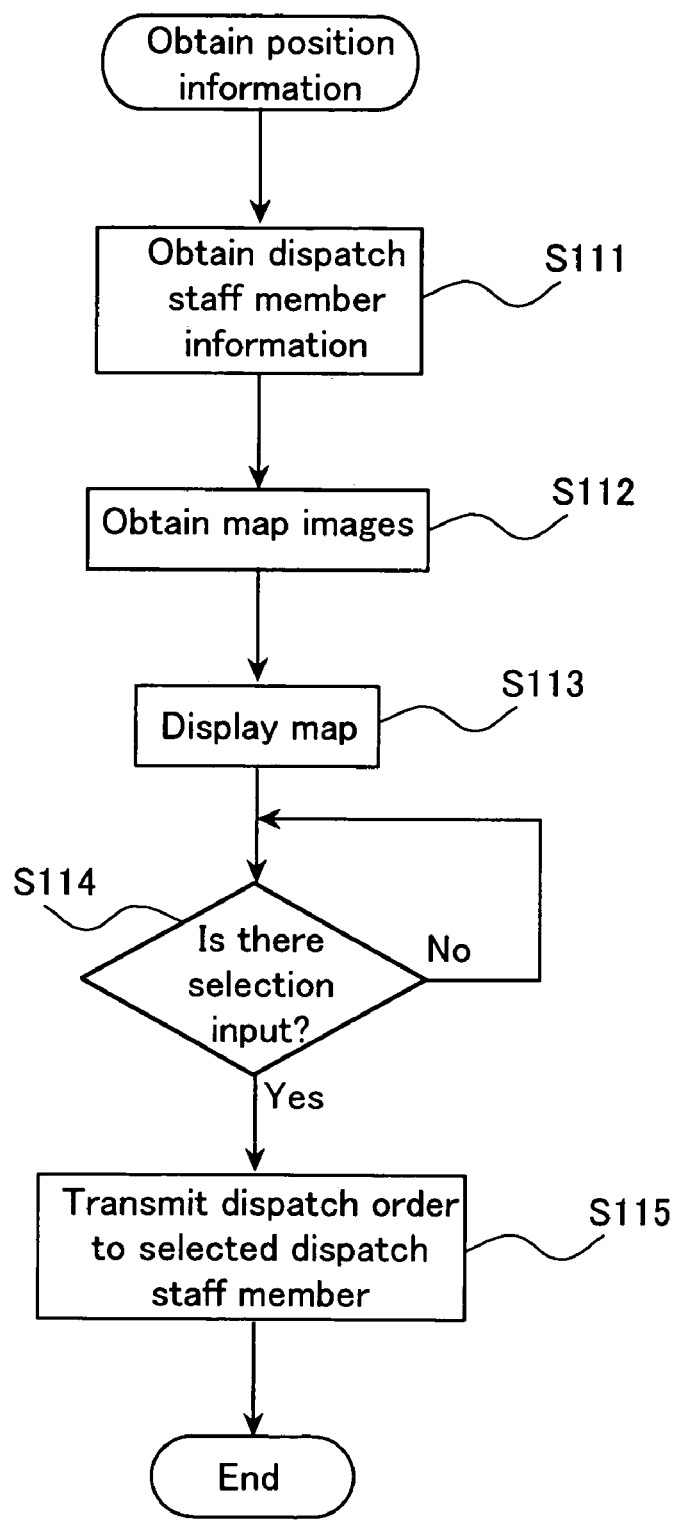
FIG. 16 is a flowchart showing the operation of the dispatch support system after the position information of customer is specified by the position information system.

The operation of the customer service support system 100 after the position information of the customer is specified by the position information system 101 as above is shown in FIG. 16.

Here, the display control portion 132 searches the dispatch staff member information database 134 based on the customer position information that is specified by the position information system 101 and obtains information on dispatch staff members in the vicinity of that customer (step S111). The display control portion 132 also searches the map database 138 based on the position information and obtains map images of the area surrounding the customer (step S112). Then, based on these, the display control portion 132 displays a map of the area surrounding the customer on the display 136 (step S113).

It should be noted that here it is preferable that the customer is displayed positioned in the middle of the screen of the display 136. For example, if the longitude and latitude of the customer are (x, y) when map images are obtained in step S112, then this can be achieved by obtaining map image information of a region in which the longitude is the range of x±α and the latitude is the range of y±β, where α and β are predetermined degrees, from the map database 138. Thus, by displaying the customer location in the center of the screen, the operator can ascertain the positional relationships between the customer and each dispatch staff member in a single glance without scrolling the screen, making selection of a staff member to be dispatched easy.

The process of step S111 can be achieved by extracting the position information (longitude X, latitude Y) included in the dispatch staff member information from the dispatch staff member information database 134 so that $$x-\alpha \leq X \leq x+\alpha$$

and $$y-\beta \leq Y \leq y+\beta$$

if, for example, the predetermined region around the customer has a longitude in the range of x±α and a latitude in the range of y+β as mentioned above.

An example of the map shown on the display 136 is shown in FIG. 12. In FIG. 12, a star-shaped marking 61 displayed in the center of the screen represents the location of the customer. Circular markings 62 each represent the location of a dispatch staff member in the vicinity of the customer, and balloon graphics 63 shown next to the circular markings 62 express the current status of each customer service member.

The name of staff in charge, status, and report time shown in the balloon graphics 63 are displayed based on the dispatch staff member information obtained from the dispatch staff member information database 134 in step S111.

It should be noted that the example screen shown in FIG. 12 is only one example, and various changes can be made to the appearance of the display on the display 136. For example, FIG. 12 shows all dispatch staff members in the area around the customer, but conceivably the display could be limited to staff members that can be dispatched (for example, those with no tasks scheduled next). Also, FIG. 12 shows the dispatch staff member information using the balloon graphics 63, however, another conceivable approach is to assign different colors to the circular markings 62, which represent the location of the dispatch staff members, to correspond to the task and the status of the each dispatch staff member.

Thus, by displaying the location and the status of dispatch staff members in the vicinity of the customer on the display 136, the operator can select the dispatch staff member who can most quickly arrive at the customer location. By for example operating the input device 137 and clicking the circular marking 62 representing the selected dispatch staff member on the display 136, the operator can input that the dispatch staff member has been selected.

When this input is performed (YES in step S114), the dispatch order portion 135 receives this selection input and transmits a dispatch order to the customer service member that has been selected (step S115). The dispatch order is achieved by automated voice or electronic mail, for example. It should be noted that the telephone number or the electronic mail address of the portable terminal 104 of the dispatch staff member that is selected, which serves as the destination for the dispatch order, is obtained from the dispatch staff member information database 134.

Thus, with the customer service support system 100 according to this embodiment, when a telephone call is received from a customer, a map of the area surrounding the customer is displayed based on the telephone number of the telephone 103 of the customer, and the location and the status of dispatch staff members near the customer are displayed in the map, allowing an appropriate dispatch staff member to be quickly selected and dispatched to the customer location.

Also, the position information system 101 obtains the telephone number of the customer and specifies the position information of the customer based on this telephone number, so that the location of the customer can be determined quickly, even if a communication is received from a new customer, for example, who is not registered as a user.

It should be noted that the present invention is not limited to the first and the second embodiments described above, and various alterations are possible within the scope of the invention.

First, the position information system and the dispatch support system of the invention are not limited to the customer service support system (dispatch support system) described in the present embodiment, and can be adopted for various applications.

Also, in the above description, first the user location obtaining portion 120 searches the customer database 131 (step S102), and if the customer is already registered as a user, then the position information that has been registered is used (step S103), however, it is possible to omit steps S102 and S103 and always obtain the position information of the customer from the sender telephone number, regardless of whether the user is registered.

Furthermore, in the above description, the position information that is output from the position information system 101 to the display control portion 132 is latitudinal and longitudinal information, however, if the map database 138 is capable of using an address to extract map images of the area surrounding that address, then it is possible to adopt a configuration in which the address that is extracted from the telephone number/address database 113 using the telephone number as the search key is output to the display control portion 132. In this case, the position information search portion 122 and the address/position information database 114 shown in FIG. 14 can be obviated.

It is also possible to adopt a configuration in which the portable terminals 104 are internally provided with a GPS (global positioning system) receiver for receiving position information from a GPS, and position information obtained from the GPS is reported to the dispatch staff member information update portion 133 by electronic mail as the current location of the dispatch staff members.

Also, the application for the position information system and the dispatch support system, for example, according to the present invention is not limited to the application of dispatching customer service members or the like for the purpose of performing after-service of a device, for example, that has been sold, and the present invention can find application in a wide variety of commercial fields, such as in (1) the dispatch of sales representatives, medical and pharmaceutical information representatives, or traveling salespersons, for example, for the purpose of sales and sales promotion activities, (2) the dispatch of garbage collectors, delivery persons, or cleaning representatives, for example, for the purpose of collecting items, and (3) the dispatch of or a delivery service for security guards, cleaning industry personnel, home nursing personnel, or babysitters, for example, for the purpose of providing various services at the dispatch location. Also, the various services at the dispatch location can be charge services or free services.

Also, in FIG. 14 an illustrative configuration was shown in which the various databases are provided inside the customer service support system 100, however, this is not a limitation, and for example, it is also possible to use outside databases provided by a third party for the telephone number/address database 113, the address/position information database 114, and/or the map database 138. Also, the telephone number/address database 113 and the address/position information/database 114 can be configured as a single database.

Also, the customer service support system 100 can be achieved as a concentrated system using a main frame computer (host computer) and storage devices on which the various databases are stored, however, it may also be a system in which the various functional blocks are suitably dispersed. In this case, the position information system 101 may be configured so as to operate on the same computer as the customer service support system 100, or may be achieved by an independent computer.

Also, the portable terminals 104 do not necessarily have to be provided with a portable telephone function, and for example can be achieved by a portable computer such as a palm-top computer or a notebook-type computer.

INDUSTRIAL APPLICABILITY

As described above, with the present invention it is possible to provide a dispatch support system with which it is possible to quickly respond to customers or the like by specifying the location to which a dispatch is to be made based on the telephone number at the time a dispatch request is made. It is also possible to provide a dispatch support system with which appropriate staff members can be selected and dispatched when there is a dispatch request, because the dispatch staff members transmit position information and event information representing their current status to a dispatch order computer of the dispatch support center from the terminal devices held by the dispatch staff members.

The invention claimed is:

1. A dispatch support system comprising terminal devices carried by dispatch staff members and a management device for supporting dispatch of the dispatch staff members,
   wherein the terminal devices comprise:
      a position information obtaining portion for obtaining information on its location from a positioning system;
      an input portion for the dispatch staff members to input status data expressing their status; and
      a communications portion for transmitting position information obtained by the position information obtaining portion and status data input through the input portion, to the management device;
   wherein the management device comprises:
      a communications portion that communicates with the terminal devices;
      a dispatch staff member information storage portion storing dispatch staff member information on each dispatch staff member, including position information and status data received from the terminal devices; and
      a support processing portion that, when there is a request for dispatch, performs a process for supporting selection of a staff member to dispatch to a dispatch location based on dispatch location information including position information on the dispatch location and dispatch staff member information on the dispatch staff members that is obtained from the dispatch staff member information storage portion,
   wherein the support processing portion in the management device includes a display and a display control portion, and
   wherein the display control portion, when there is a dispatch request, displays a map of the area surrounding the dispatch location on a display in such a manner that the dispatch location is located in a screen center portion based on the position information of that dispatch location, and also displays markings representing dispatch staff members in the area surrounding the dispatch location at the locations of the dispatch staff members in the map that is displayed on the display based on the position information of the dispatch staff members included in the dispatch staff member information.

2. The dispatch support system according to claim 1, wherein the management device further comprises:
   a telephone number obtaining portion for obtaining the sender telephone number when a telephone call is received, and
   a position information obtaining portion for obtaining position information on the sender telephone using a database with which the telephone number and a location where the telephone is installed can be specified; and
   wherein the support processing portion uses position information obtained by the position information obtaining portion as position information on the dispatch location.

3. The dispatch support system according to claim 2, wherein the display control portion sets the markings representing the dispatch staff members in the area surrounding the dispatch location to a display condition corresponding to a status of the dispatch staff members based on status data of the dispatch staff members, which are included in the dispatch staff member information.

4. The dispatch support system according to claim 1, wherein the support processing portion in the management device further comprises a selection portion for selecting an appropriate staff member to be dispatched to the dispatch location from the dispatch staff members in the area surrounding the dispatch location based on the dispatch staff member information on each dispatch staff member, which is obtained from the dispatch staff member information storage portion.

5. The dispatch support system according to claim 1, wherein the management device further comprises an information provision portion for transmitting dispatch staff member support information to the terminal devices of the dispatch staff members via the communications portion.

6. The dispatch support system according to claim 5, wherein the dispatch staff member support information includes information relating to service cases at that dispatch location.

7. The dispatch support system according to claim 5, wherein the dispatch staff member support information includes information relating to identical cases.

* * * * *

UNITED STATES PATENT AND TRADEMARK OFFICE
CERTIFICATE OF CORRECTION

| | |
|---|---|
| PATENT NO. | : 7,054,647 B2 |
| APPLICATION NO. | : 10/381348 |
| DATED | : May 30, 2006 |
| INVENTOR(S) | : Inaba |

It is certified that error appears in the above-identified patent and that said Letters Patent is hereby corrected as shown below:

Title Page (75) Inventors:

"Minoru Inaba, Kyoto (JP); Kosuke Nakanishi, Kyoto (JP)" should read -- Minoru Inaba, Kyoto (JP) --

Signed and Sealed this

Fifth Day of February, 2008

JON W. DUDAS
*Director of the United States Patent and Trademark Office*